(12) United States Patent
Saito et al.

(10) Patent No.: US 7,333,143 B2
(45) Date of Patent: Feb. 19, 2008

(54) LIGHT AMOUNT ADJUSTMENT ACTUATOR UNIT, STEPPING MOTOR, OPTICAL UNIT, AND ELECTRONIC CAMERA

(75) Inventors: Shoichi Saito, Hachioji (JP); Hiromichi Sakano, Hachioji (JP)

(73) Assignee: Olympus Corporation, Tokyo (JP)

( * ) Notice: Subject to any disclaimer, the term of this patent is extended or adjusted under 35 U.S.C. 154(b) by 717 days.

(21) Appl. No.: 10/602,528

(22) Filed: Jun. 23, 2003

(65) Prior Publication Data

US 2004/0036798 A1   Feb. 26, 2004

(30) Foreign Application Priority Data

Jul. 16, 2002 (JP) ............................. 2002-207464
Apr. 11, 2003 (JP) ............................. 2003-107573
Apr. 11, 2003 (JP) ............................. 2003-107574

(51) Int. Cl.
   *G02B 13/16* (2006.01)
   *H04N 5/225* (2006.01)
   *H04N 5/232* (2006.01)
   *G03B 13/00* (2006.01)

(52) U.S. Cl. .................. 348/335; 348/374; 348/357

(58) Field of Classification Search ................ 348/373, 348/374, 375, 369, 357, 335, 340, 341, 345; 359/808, 823, 827
See application file for complete search history.

(56) References Cited

U.S. PATENT DOCUMENTS

| | | | | |
|---|---|---|---|---|
| 6,390,693 B1 * | 5/2002 | Miyamoto et al. | ......... | 396/529 |
| 6,809,772 B1 * | 10/2004 | Motta et al. | ................ | 348/341 |
| 6,829,011 B1 * | 12/2004 | Higuchi et al. | ............. | 348/340 |
| 7,012,647 B2 * | 3/2006 | Shintani | .................... | 348/374 |

FOREIGN PATENT DOCUMENTS

| | | |
|---|---|---|
| JP | 7-163126 | 6/1995 |
| JP | 11-234986 | 8/1999 |
| JP | 2000-310803 | 11/2000 |

* cited by examiner

*Primary Examiner*—Tuan Ho
*Assistant Examiner*—Justin P Misleh
(74) *Attorney, Agent, or Firm*—Straub and Pokotylo; John C. Pokotylo

(57) ABSTRACT

An optical unit includes a first unit formed by accommodating, in a first case, an optical member which receives a light beam from an object, a light amount adjustment mechanism to adjust the amount of the light beam, and a light amount adjustment actuator unit constituted by integrating first and second actuators that drive the light amount adjustment mechanism, and a second unit formed by accommodating, in a second case, a lens group which is movably arranged to obtain a predetermined object image from the light beam, and a lens driving actuator unit which is mainly constituted by a stepping motor having a stacked stator core to drive the lens group. The first and second units can detachably be coupled through a coupling unit provided between the first case and the second case.

8 Claims, 17 Drawing Sheets

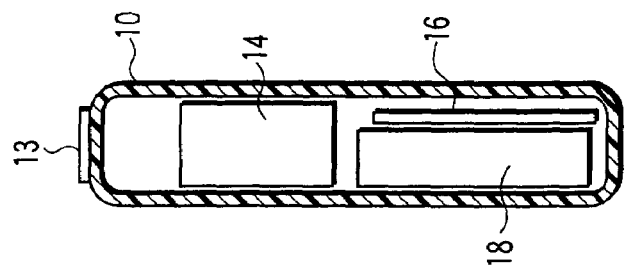
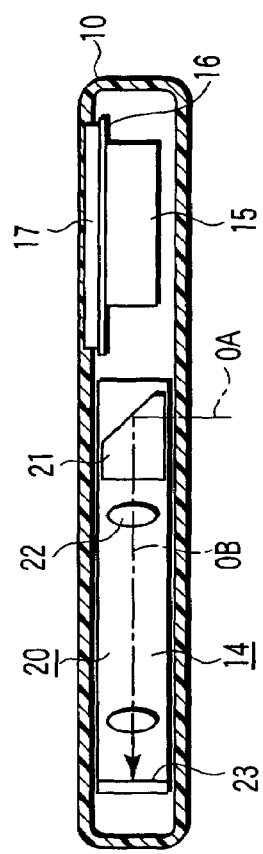
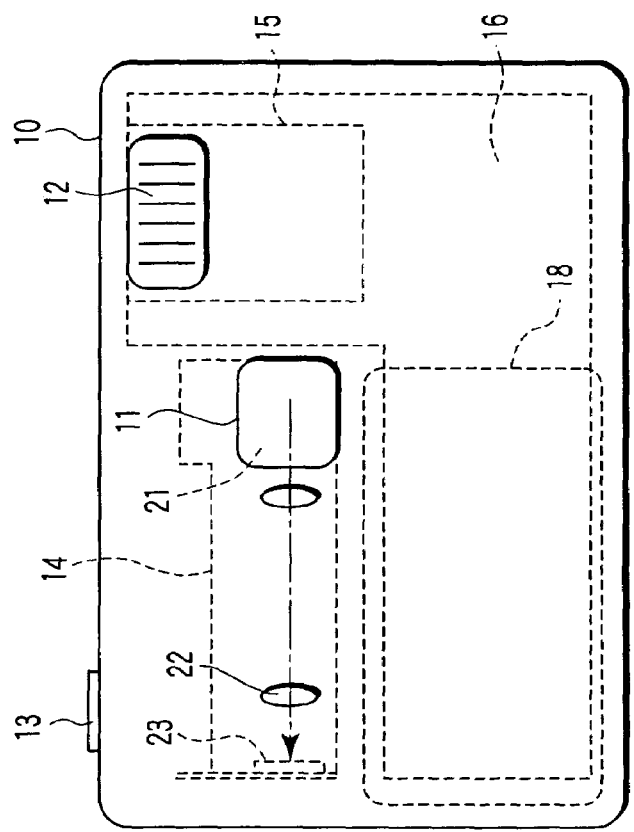

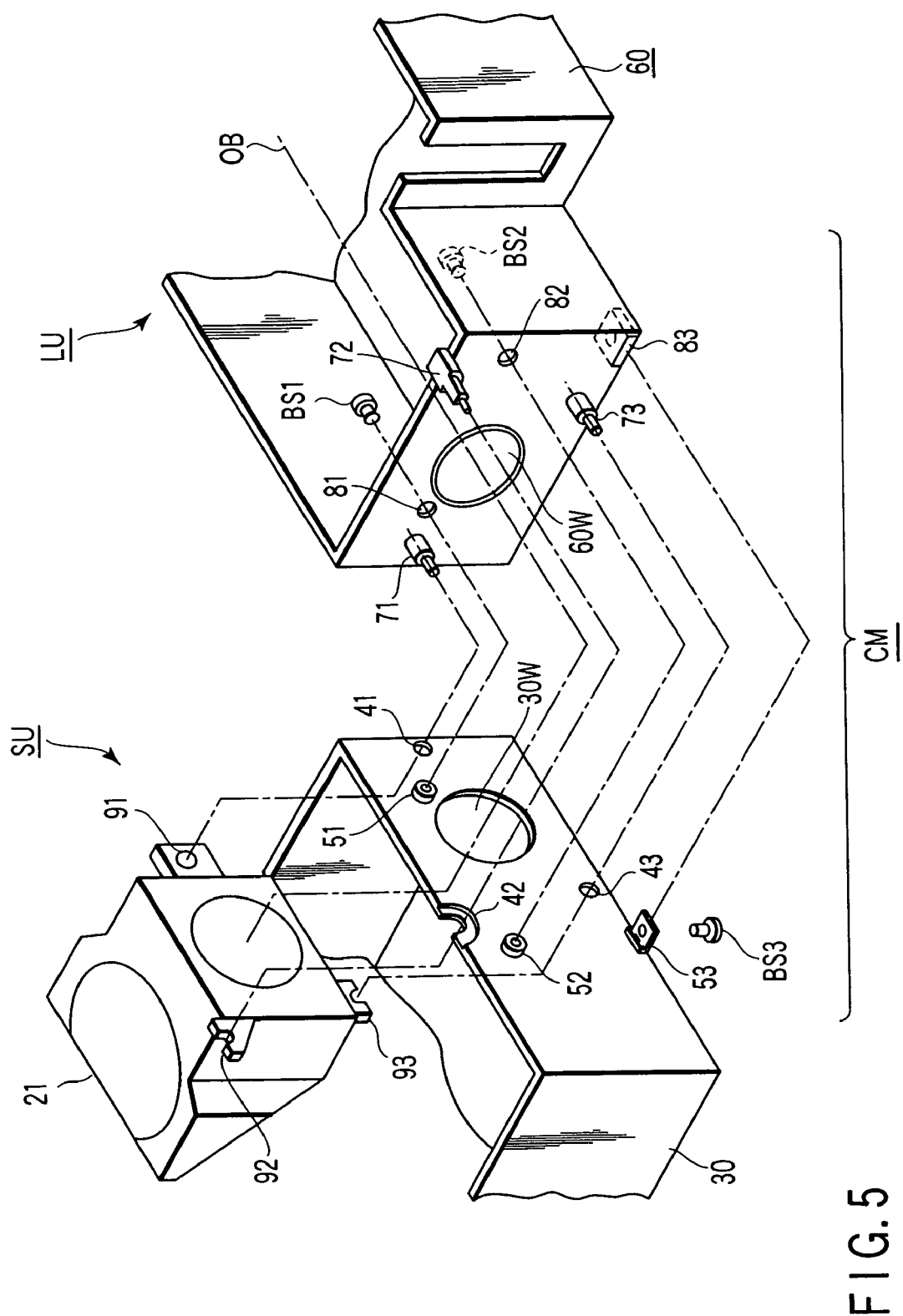
F I G. 5

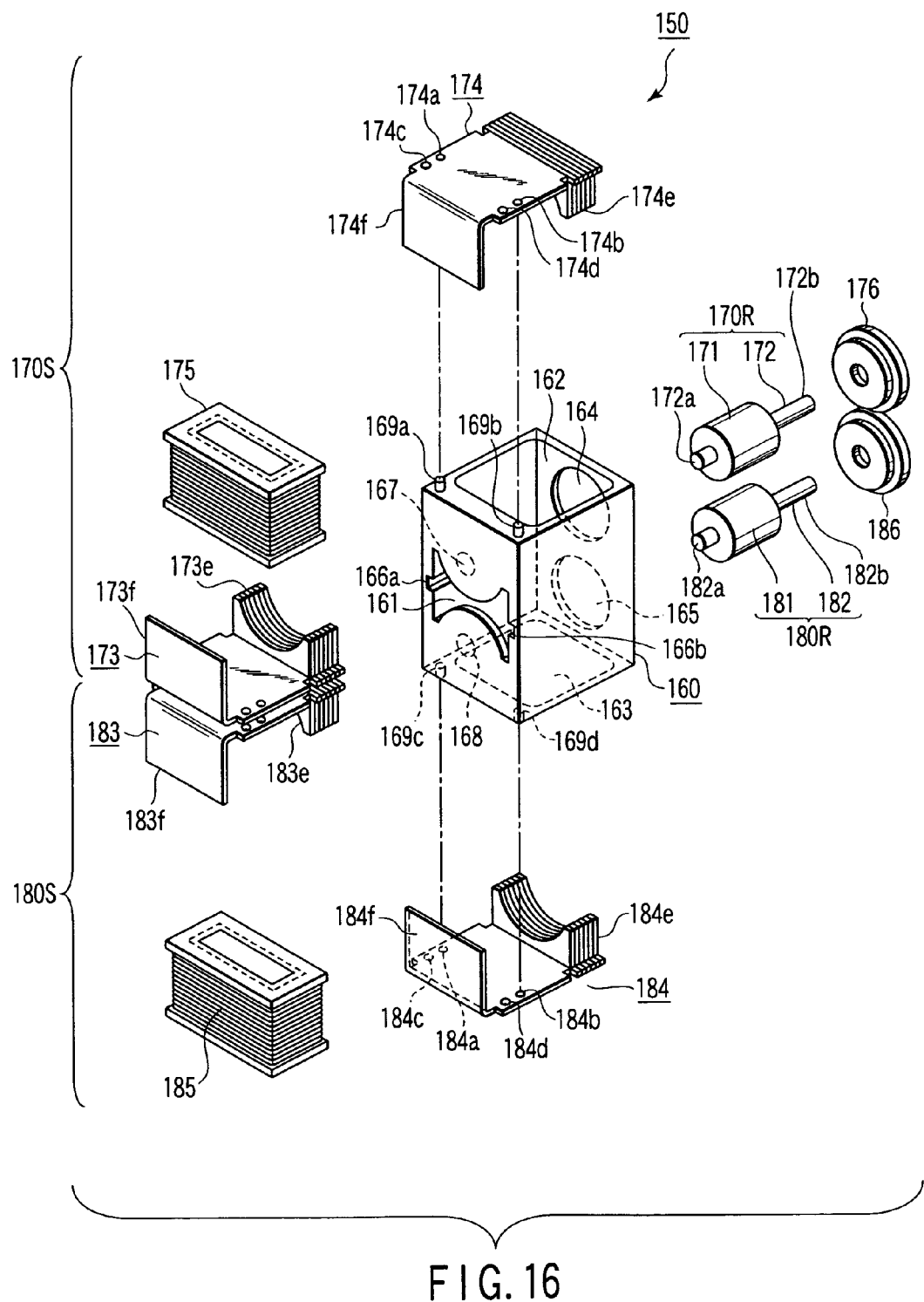
F I G. 16

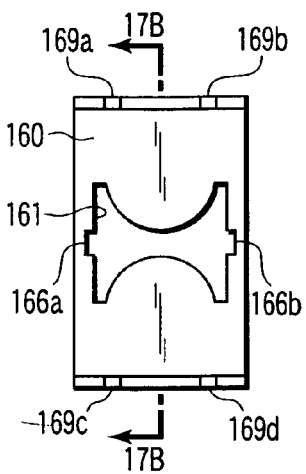
F I G. 17A
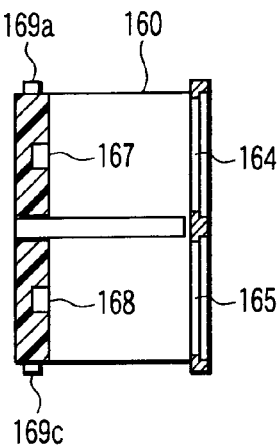
F I G. 17B
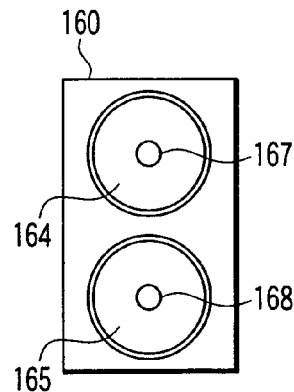
F I G. 17C
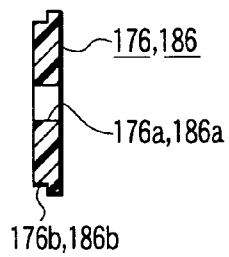
F I G. 18
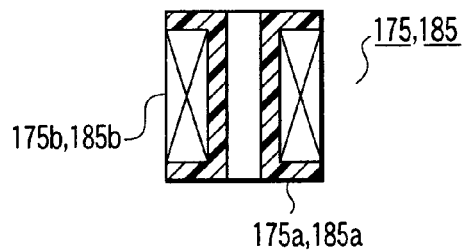
F I G. 19
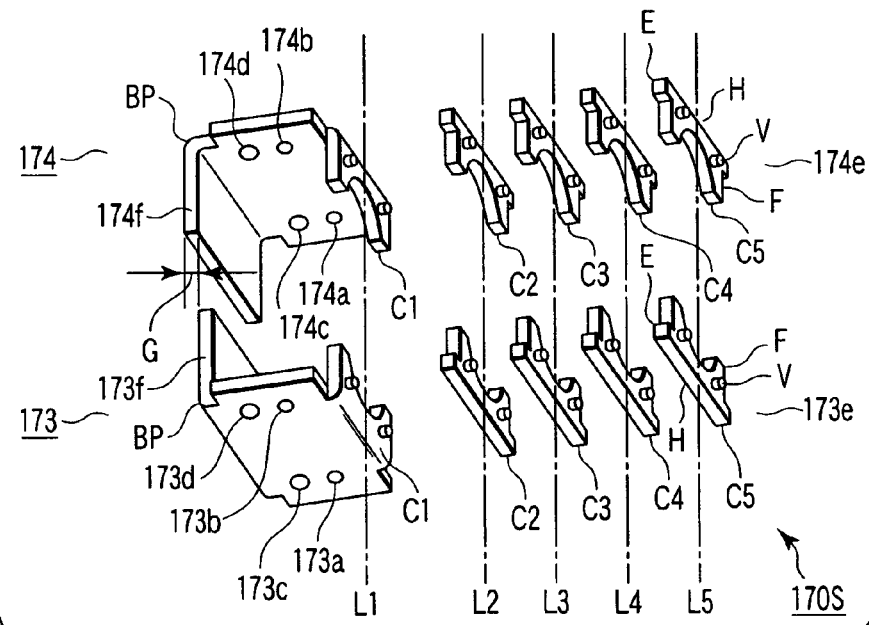
F I G. 20

LIGHT AMOUNT ADJUSTMENT ACTUATOR UNIT, STEPPING MOTOR, OPTICAL UNIT, AND ELECTRONIC CAMERA

CROSS-REFERENCE TO RELATED APPLICATIONS

This application is based upon and claims the benefit of priority from the prior Japanese Patent Applications No. 2002-207464, filed Jul. 16, 2002; No. 2003-107573, filed Apr. 11, 2003; and No. 2003-107574, filed Apr. 11, 2003, the entire contents of all of which are incorporated herein by reference.

BACKGROUND OF THE INVENTION

1. Field of the Invention

The present invention relates to a light amount adjustment actuator unit used for a photographing apparatus such as a camera, a stepping motor which drives the lens group and the like of the photographing apparatus, an optical unit having them, and an electronic camera having the optical unit.

2. Description of the Related Art

Generally, for an optical unit in an electronic camera, a light amount adjustment mechanism which adjusts the light amount from an object, a lens group for obtaining a predetermined object image, and actuators and the like which drive the light amount adjustment mechanism and lens group are accommodated and fixed in one case.

For the optical unit in which all components such as the light amount adjustment mechanism, lens group, and actuators are integrally accommodated and fixed in one case, as described above, the assembly workability is poor, and therefore, assembly is time-consuming. In addition, adjustment after assembly is also cumbersome.

There is an actuator for driving a stop/shutter in a photographing apparatus such as a camera, in which a first actuator which drives a light shielding member and a second actuator which drives a light amount limiting member are separately arranged, as disclosed in Jpn. Pat. Appln. KOKAI publication No. 2000-310803 (paragraph [0006]; FIG. 1).

However, when two separate actuators are mounted in a photographing apparatus such as a camera, as described above, the space efficiency is low, and the apparatus becomes bulky. To avoid such an increase in apparatus size, a motor unit has been proposed in Jpn. Pat. Appln. KOKAI publication No. 11-234986 (paragraph [0038]; FIG. 13) in which two actuators are integrated, and shutter vanes and stop vanes are individually driven.

The shape of the motor unit disclosed in Jpn. Pat. Appln. KOKAI publication No. 11-234986 is long in the horizontal direction, as shown in FIG. 1 of this prior art, because two actuators are integrated. This poses restrictions on the member layout. For example, the members must be arranged in a circular shape around the optical path. A portable device such as an electronic camera requires an actuator unit that can be made as compact as possible without any restrictions.

On the other hand, the stator core of a lens driving stepping motor applied to a camera which is required to be compact is disclosed in Jpn. Pat. Appln. KOKAI publication No. 07-163126 (paragraph [0010]; FIG. 1) in which a plurality of cores formed by simply press-working a magnetic plate are separately arranged.

In the stator core using the core members manufactured by press working, as disclosed in Jpn. Pat. Appln. KOKAI publication No. 07-163126, a loss due to an eddy current is large, and the motor efficiency is insufficient. However, it has been supposed to be technically difficult to employ stacked cores as the stator core of a lens driving stepping motor which is required to be small because the object to be worked is very small.

BRIEF SUMMARY OF THE INVENTION

An apparatus according to the present invention has the following characteristic configuration. The other characteristic configurations will be clarified in the Embodiment later.

(1) An optical unit according to the present invention is characterized by comprising:

a first unit having an optical member which receives a light beam from an object, a light amount adjustment mechanism to adjust a light amount of the light beam received by the optical member, a light amount adjustment actuator which drives the light amount adjustment mechanism, and a first case which accommodates the optical member, the light amount adjustment mechanism, and the light amount adjustment actuator; and a second unit having a lens group which is movably arranged to obtain a predetermined object image from the light beam whose light amount is adjusted by the light amount adjustment mechanism, a lens driving actuator which drives the lens group, and a second case which accommodates the lens group and the lens driving actuator, wherein the first unit and second unit can detachably be coupled through coupling means provided between the first case and the second case.

(2) A light amount adjustment actuator unit according to the present invention is characterized by comprising:

an actuator case, a first actuator comprising a first rotor unit and a first stator unit, which are accommodated and held in the actuator case, and a second actuator comprising a second rotor unit and a second stator unit, which are accommodated and held in the actuator case to be adjacent to the first actuator, wherein the first stator unit comprises an internal stator member having a magnetic pole portion and an external stator member having a magnetic pole portion, the second stator unit comprises an internal stator member having a magnetic pole portion and an external stator member having a magnetic pole portion, the actuator case has a first opening portion to which the internal stator members are to be attached and which is formed in one surface, and second and third opening portions to which the external stator members are to be attached and which are formed in two surfaces perpendicular to the surface having the first opening portion, the internal stator member of the first stator unit and the internal stator member of the second stator unit are inserted into the actuator case through the first opening portion while the magnetic pole portions are attached to surround a part of an outer surface of a rotor of the first rotor unit and a part of an outer surface of a rotor of the second rotor unit, respectively, and the external stator member of the first stator unit and the external stator member of the second stator unit are attached to cover the second and third opening portions, respectively, while the magnetic pole portions are attached to surround the remaining part of the outer surface of the rotor of the first rotor unit and the remaining part of the outer surface of the rotor of the second rotor unit, respectively.

(3) A stepping motor according to the present invention is characterized by comprising:

a shaft rotatably supported, a rotor which comprises a permanent magnet arranged on the shaft, and a stator including a magnetization control coil which is arranged adjacent in parallel to an axis of the rotor and a stator core which is magnetization-controlled by the coil, wherein the stator core in the stator comprises a main stator core which is arranged in the coil and a sub stator core whose yoke portion is magnetically coupled to the main stator core and whose pole portions that apply a rotating magnetic field to the rotor are arranged around the rotor, and the main stator core is formed by integrally stacking a plurality of core plates and contact-bonding the core plates to each other on both surfaces and is coupled to the yoke portion of the sub stator core by contact bonding.

(4) An electronic camera according to the present invention is characterized by having an optical unit of (1).

(5) An electronic camera according to the present invention is characterized by having a light amount adjustment actuator unit of (2).

(6) An electronic camera according to the present invention is characterized by having a stepping motor of (3).

BRIEF DESCRIPTION OF THE SEVERAL VIEWS OF THE DRAWING

FIGS. 1A to 1C are views showing the schematic arrangement of an electronic camera according to the first embodiment of the present invention, in which FIG. 1A is a schematic longitudinal sectional view, FIG. 1B is a schematic front view, and FIG. 1C is a schematic cross-sectional view;

FIGS. 2A to 2C are views showing a modification of the electronic camera shown in FIGS. 1A to 1C, in which FIG. 2A is a schematic longitudinal sectional view, FIG. 2B is a schematic front view, and FIG. 2C is a schematic cross-sectional view;

FIGS. 3A and 3B are views showing an optical unit applied to the electronic camera according to the first embodiment of the present invention, in which FIG. 3A is a front view, and FIG. 3B is a front view showing the optical unit whose cover is detached;

FIG. 5 is a perspective view showing the coupling relationship between a light amount adjustment unit and a lens unit in the optical unit, in which the two units are separately illustrated;

FIG. 16 is an exploded perspective view showing the arrangement of the light amount adjustment actuator unit in the optical unit;

FIGS. 17A to 17C are views showing the arrangement of the actuator case of the light amount adjustment actuator unit, in which FIG. 17A is a view showing the left end face, FIG. 17B is a sectional view taken along a line 17B-17B in FIG. 17A, and FIG. 17C is a view showing the right end face;

FIG. 18 is a sectional view of a bearing member in the light amount adjustment actuator unit;

FIG. 19 is a sectional view of an exciting coil unit in the light amount adjustment actuator unit;

FIG. 20 is an exploded perspective view showing the arrangement of the internal and external stator members of a first stator member in the light amount adjustment actuator unit;

DETAILED DESCRIPTION OF THE INVENTION

First Embodiment

Figure 1C:
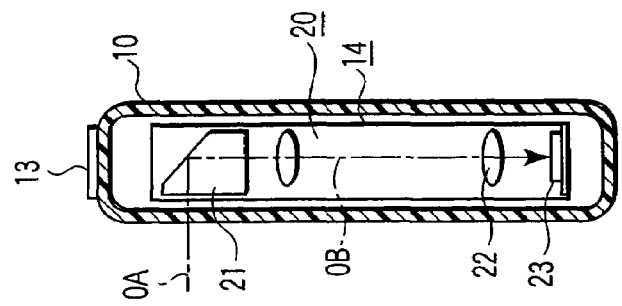
Figure 1A:
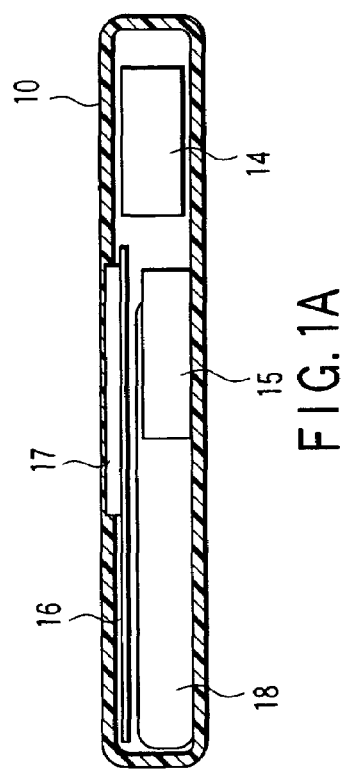
Figure 1B:
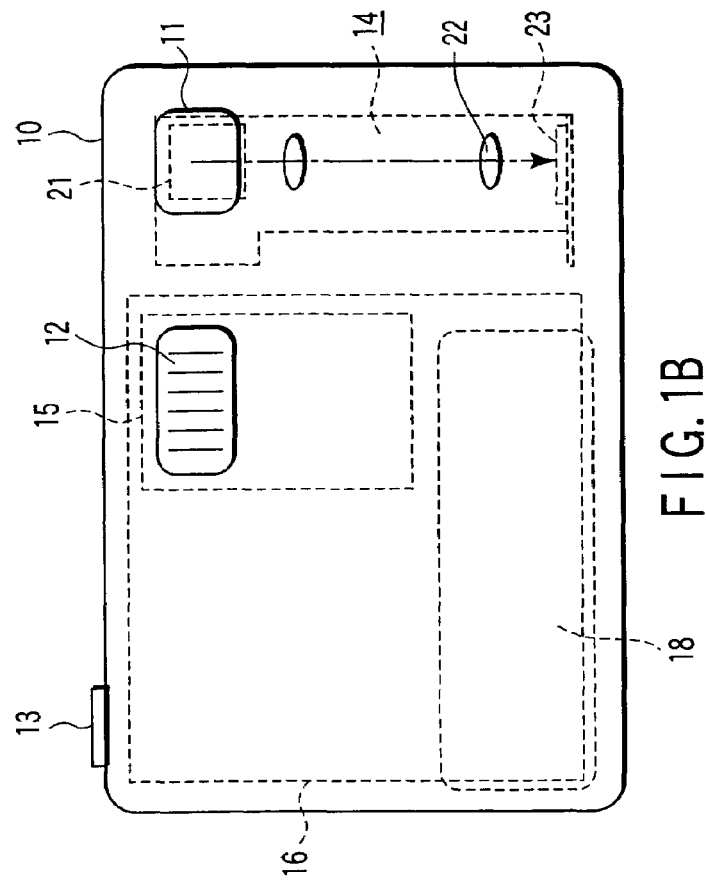

FIGS. 1A to 1C are views showing the schematic arrangement of an electronic camera according to the first embodiment of the present invention, in which FIG. 1A is a schematic longitudinal sectional view, FIG. 1B is a schematic front view, and FIG. 1C is a schematic cross-sectional view.

Referring to FIGS. 1A to 1C, reference numeral 10 denotes a camera main body. An incident opening portion 11 which receives light from an object, an electronic flash window 12, and the like are arranged on the front surface of the camera main body 10. A release button 13 is arranged on the upper surface of the camera main body 10. An image display window and the like (not shown) are arranged on the rear surface of the camera main body 10. An optical unit 14, electronic flash unit 15, electronic circuit board 16, image display device (e.g., an LCD) 17, battery room 18 and the like are arranged in the camera main body 10.

The optical unit 14 has an optical system 20 in which light from an object, which becomes incident from the incident opening portion 11, is reflected by a prism 21 serving as an optical member to the direction of an optical axis OB perpendicular to an incident optical axis OA such that the light-receiving surface of an image sensing element 23 is irradiated with an optical image obtained through a lens group 22. In this way, the image sensing element 23 photoelectrically converts the object image. The optical unit 14 according to this embodiment is arranged to be long in the vertical direction when viewed from the front of the camera, as shown in FIG. 1B.

FIGS. 2A to 2C are views showing a modification of the electronic camera shown in FIGS. 1A to 1C, in which FIG. 2A is a schematic longitudinal sectional view, FIG. 2B is a schematic front view, and FIG. 2C is a schematic cross-sectional view.

The electronic camera shown in FIGS. 2A to 2C is different from that shown in FIGS. 1A to 1C mainly in that the optical unit 14 is accommodated and arranged in the camera main body to be long in the horizontal direction when viewed from the front of the camera, as shown in FIG. 2B. Accordingly, the shapes and layout of the remaining components accommodated in the camera main body 10 also slightly change. However, the functions are the same, and the same reference numerals as in FIGS. 1A to 1C denote parts having the same functions as in FIGS. 2A to 2C.

Figure 3A:
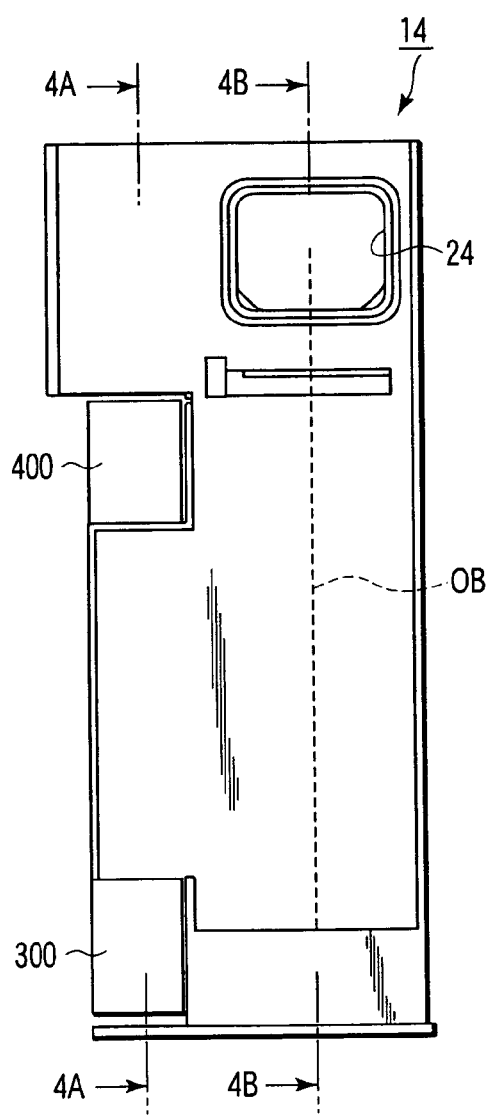
Figure 3B:
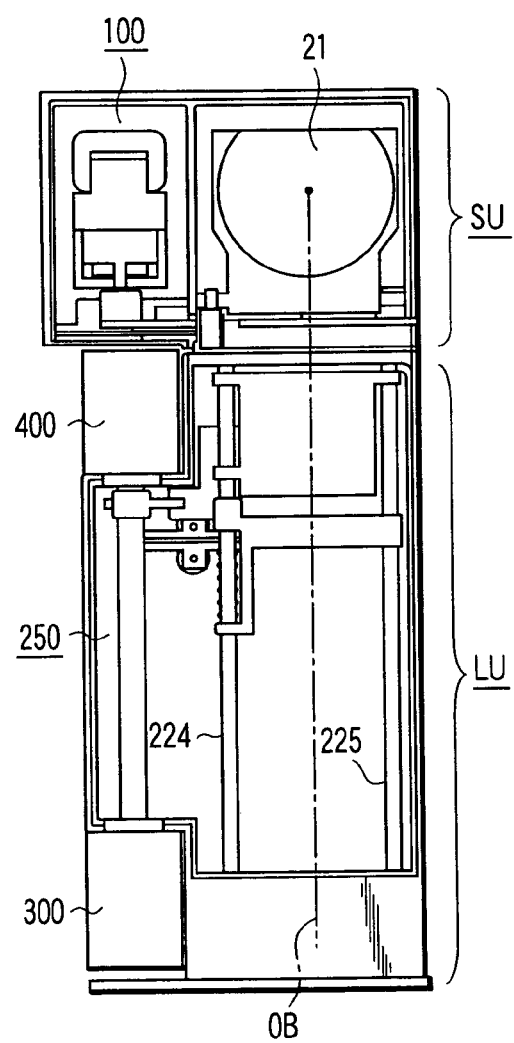

FIGS. 3A and 3B are views showing an optical unit applied to the electronic camera according to the first embodiment of the present invention, in which FIG. 3A is a front view, and FIG. 3B is a front view showing the optical unit whose cover is detached.

Figure 4A:
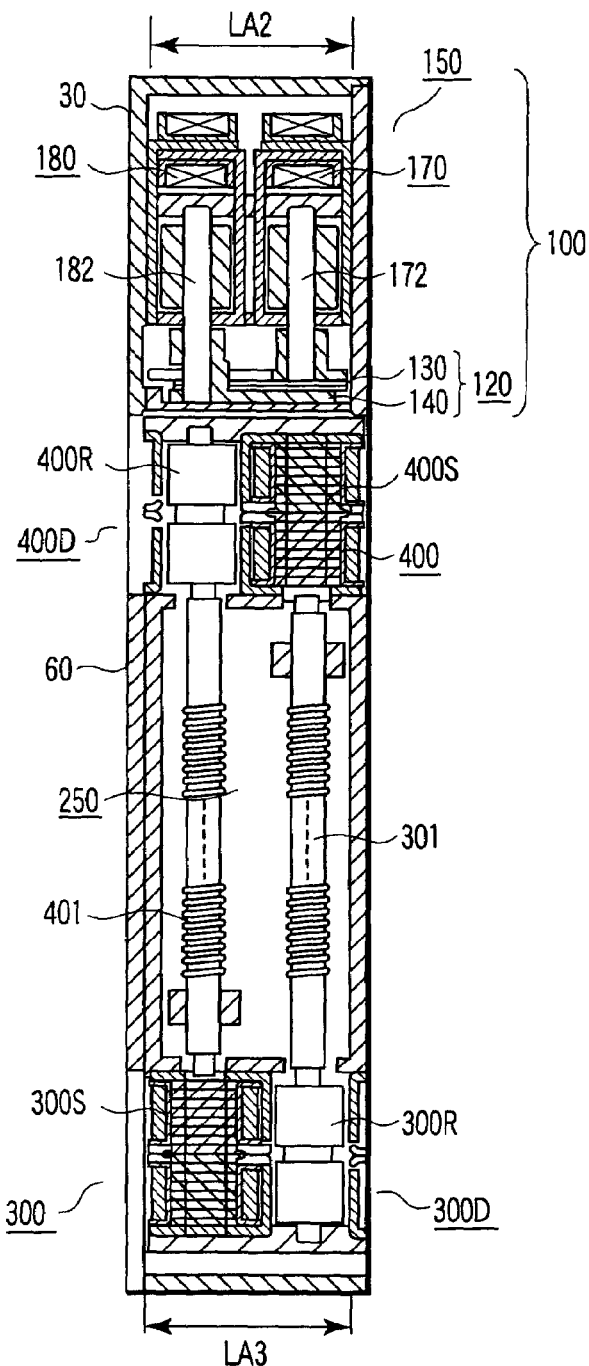
FIG. 4A is a sectional view taken along a line 4A-4A in FIG. 3A.
Figure 4B:
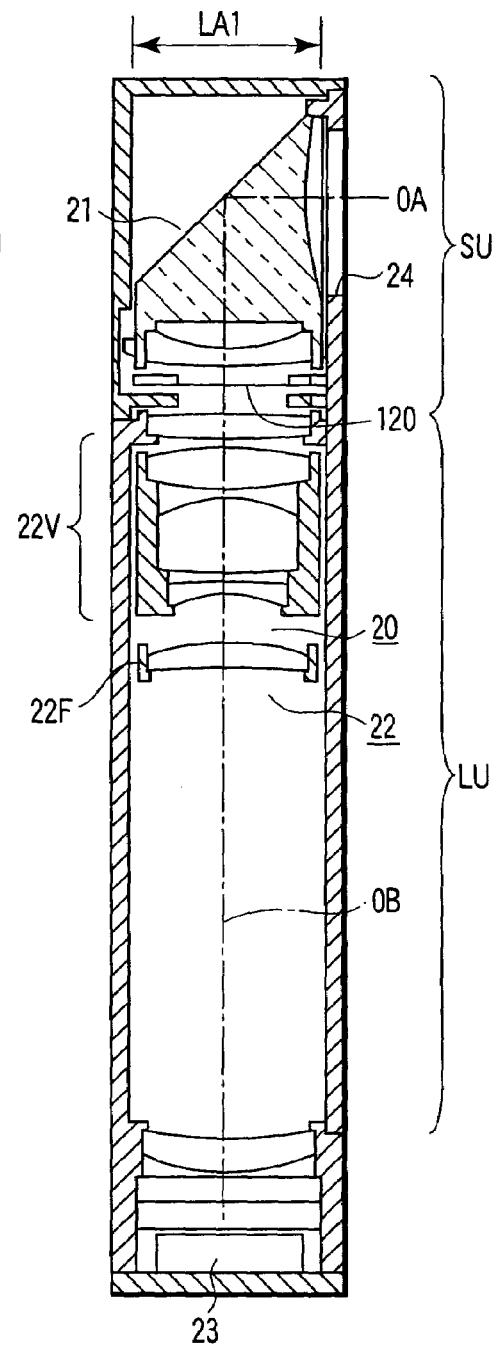
FIG. 4B is a sectional view taken along a line 4B-4B in FIG. 3A.

FIG. 4A is a sectional view taken along a line 4A-4A in FIG. 3A. FIG. 4B is a sectional view taken along a line 4B-4B in FIG. 3A.

As shown in FIGS. 3A, 3B, 4A, and 4B, the optical unit 14 is formed by detachably integrating a light amount adjustment unit SU (first unit) accommodated in a case 30 and a lens unit LU (second unit) accommodated in a case 60, as will be described later.

The light amount adjustment unit SU includes the deflecting optical system 20 having the prism 21 as an optical member and a light amount adjustment device 100 which adjusts the light amount of the deflecting optical system 20. The light amount adjustment device 100 comprises a light amount adjustment mechanism 120 and a light amount adjustment actuator unit 150 which drives and controls the light amount adjustment mechanism 120.

The light amount adjustment mechanism 120 includes a shutter mechanism 130 serving as a light shielding mechanism and a light amount limiting mechanism 140 having an attenuating function and the like. The shutter mechanism 130 appropriately opens an opening portion on a light shielding base arranged in the optical path while opposing the light exit surface of the deflecting optical system 20. The light amount limiting mechanism 140 limits the amount of light that passes through the opening portion by an attenuation filter or the like.

The light amount adjustment actuator unit 150 has a first actuator 170 and second actuator 180. The first actuator 170 is actuator that drives the shutter mechanism 130 and has a driving shaft 172 rotatably supported. The second actuator 180 is an actuator which drives the light amount limiting mechanism 140 and has a driving shaft 182 rotatably supported.

The driving shafts 172 and 182 are arranged to be adjacent and face the same direction. The driving shafts 172 and 182 are also integrated and accommodated in one case, as will be described later. The arrangement of the light amount adjustment unit SU will be described later in more detail.

The lens unit LU includes the lens group 22 that can move in the direction of the second optical axis OB after deflection along a pair of guide shafts 224 and 225 (FIG. 22), and a lens driving actuator unit 250 which drives and moves the lens group 22 to a predetermined position in the optical axis direction. The lens driving actuator unit 250 has a first stepping motor 300 serving as a variator lens driving actuator and a second stepping motor 400 serving as a focusing lens driving actuator.

The first stepping motor 300 drives a variator lens group 22V of the lens group 22. The second stepping motor 400 drives a focusing lens group 22F of the lens group 22.

The first and second stepping motors 300 and 400 have shafts 301 and 401 that are rotatably supported, rotors 300R and 400R each of which is made of a permanent magnet and arranged on one side of a corresponding one of the shafts 301 and 401, and stators 300S and 400S each of which includes an exciting coil and is arranged near a corresponding one of the rotors 300R and 400R.

The shaft 301 of the first stepping motor 300 and the shaft 401 of the second stepping motor 400 are arranged in parallel. Driving sections 300D and 400D each comprising a rotor and stator are located on opposite sides, as shown in FIG. 4A.

The coupling relationship between the light amount adjustment unit SU and the lens unit LU will be described next with reference to figures from FIG. 5. FIG. 5 is a perspective view showing the coupling relationship between the light amount adjustment unit SU and the lens unit LU in the optical unit 14, in which the two units are separately illustrated.

The light amount adjustment unit SU serving as the first unit has the first case 30 (the case 30 without the cover is illustrated) which accommodates the above-described prism 21 and the like which receive a light beam from an object. The lens unit LU serving as the second unit has the second case 60 (the case 60 without the cover is illustrated) which accommodates the above-described lens group 22 (not shown in FIG. 5) and the like. Light beam transmission windows 30W and 60W opposing each other are arranged at the coupling portion between the first case 30 and the second case 60.

The light amount adjustment unit SU and lens unit LU can be detachably coupled by a coupling means CM provided between the first case 30 and the second case 60. The coupling means CM comprises the following coupling elements.

Insertion portions 41, 42, and 43 are formed on the coupling portion of the first case 30. Engaging portions 91, 92, and 93 are formed at the peripheral portion of the prism 21. Positioning members 71, 72, and 73 formed from projecting portions which project along the direction of the optical axis OB are formed on the coupling portion of the second case 60 at positions opposing the insertion portions 41, 42, and 43, respectively. The positioning members 71, 72, and 73 are inserted into the insertion portions 41, 42, and 43, respectively. The distal ends of the positioning members 71, 72, and 73 engage with the engaging portions 91, 92, and 93, respectively.

Threaded holes 51 and 52 are formed on the coupling portion of the first case 30. Screw insertion holes 81 and 82 are formed on the coupling portion of the second case 60 at positions opposing the threaded holes 51 and 52, respectively. Screws BS1 and BS2 threadably engage with the threaded holes 51 and 52 in the horizontal direction through the screw insertion holes 81 and 82, respectively.

A projecting piece 53 with an attachment hole is provided on the coupling portion of the first case member 30. A recess portion 83 with a threaded hole is formed on the coupling portion of the second case 60 at a position opposing the projecting piece 53 with an attachment hole. The projecting piece 53 with an attachment hole fits in the recess portion 83 with a threaded hole. A screw BS3 inserted into the attachment hole of the projecting piece 53 with an attachment hole threadably engages with the threaded hole of the recess portion 83 with a threaded hole in the vertical direction.

In coupling the first case 30 and second case 60, the proximal portions of the positioning members 71, 72, and 73 position the first case 30 and second case 60, and simultaneously, the distal end portions of the positioning members 71, 72, and 73 position the prism 21 to be accommodated in the first case 30, as will be described below.

The positioning member 71 comprises a two-step column formed by stacking two columns having different diameters. The large-diameter portion of the positioning member 71 is inserted into the through hole 41 formed in the first case 30. The small-diameter portion at the distal end engages with the engaging portion 91 of the prism 21 to be accommodated in the first case 30.

The positioning member 72 comprises a three-step column formed by stacking three columns having different diameters. One surface (upper surface in FIG. 5) of the positioning member 72 is a so-called D cut surface (flat surface). The outer surface of the large-diameter half columnar portion and intermediate-diameter half columnar portion of the positioning member 72 is fitted in the step groove portion 42 formed in the first case 30. The small-diameter portion at the distal end engages with the engaging portion 92 of the prism 21 to be accommodated in the first case 30.

The positioning member 73 comprises a two-step column formed by stacking two columns having different diameters. One surface (lower surface in FIG. 5) of the positioning member 73 is a so-called D cut surface (flat surface). The large-diameter portion of the positioning member 73 is inserted into the through hole 43 formed in the first case 30. The small-diameter portion at the distal end engages with the engaging portion 93 of the prism 21 to be accommodated in the first case 30.

Figure 6:
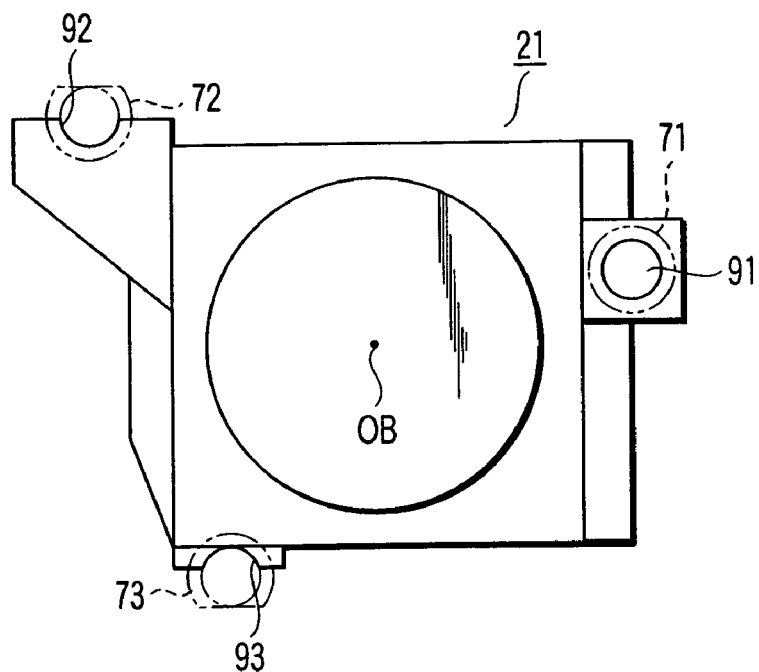
FIG. 6 is a front view showing a state wherein positioning members of the lens unit engage with engaging portions of a prism in the light amount adjustment unit, in which the prism is viewed from the direction of an optical axis OB.

FIG. 6 is a front view showing a state wherein the positioning members 71 to 73 (indicated by alternate long and two short dashed lines) engage with the engaging portions 91 to 93 of the prism 21 which is viewed from the direction of the optical axis OB. Positioning of the prism 21 in the first case 30 is done when the distal ends of the positioning members 71, 72, and 73 engage with the engaging portions formed at the peripheral portion of the prism.

Figure 7:
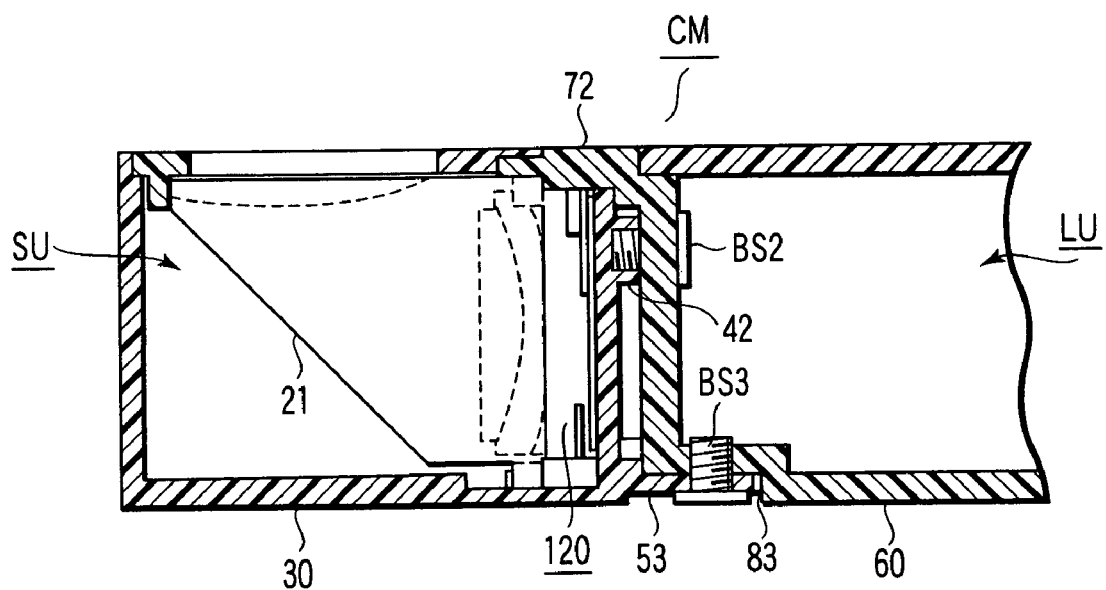
FIG. 7 is a sectional view showing a state wherein the light amount adjustment unit and lens unit are integrally coupled.

FIG. 7 is a sectional view showing a state wherein the light amount adjustment unit SU and lens unit LU are integrally coupled by the coupling means CM. As shown in FIG. 7, the light amount adjustment unit SU and lens unit LU are positioned by the positioning members, fixed in the horizontal and vertical directions by the screws, and integrated. When the screws are detached as needed, the light amount adjustment unit SU can be separated from the lens unit LU. As shown in FIG. 7, the light amount adjustment mechanism 120 is arranged in the light amount adjustment unit SU near the coupling surface to the lens unit LU.

The above-described optical unit 14 has the following characteristic features.

[1] The optical unit 14 is characterized by comprising the light amount adjustment unit SU having an optical member (prism 21) which receives a light beam from an object, the light amount adjustment mechanism 120 to adjust the light amount of the light beam received by the optical member (prism 21), the light amount adjustment actuator unit 150 which drives the light amount adjustment mechanism 120, and the first case 30 which accommodates the optical member (21), light amount adjustment mechanism 120, and light amount adjustment actuator unit 150, and the lens unit LU having the lens group 22 which is movably arranged to obtain a predetermined object image from the light beam whose light amount is adjusted by the light amount adjustment mechanism 120, the lens driving actuator unit 250 which drives the lens group 22, and the second case 60 which accommodates the lens group 22 and lens driving actuator unit 250, wherein the light amount adjustment unit SU and lens unit LU can detachably be coupled through the coupling means CM provided between the first case 30 and the second case 60.

In the optical unit 14, the light amount adjustment unit SU and lens unit LU can detachably be coupled through the coupling means CM provided between the first case 30 and the second case 60. For this reason, the light amount adjustment unit SU and lens unit LU can be manufactured by individually assembling and adjusting them. Hence, the assembly can be simplified, and the units can be appropriately assembled in a short time. In addition, adjustment and maintenance after assembly can also easily be executed.

[2] The optical unit 14 according to [1] is characterized in that the light amount adjustment actuator unit 150 is arranged adjacent to one side of the optical member (21).

[3] The optical unit 14 according to [1] or [2] is characterized in that the optical member (21) includes a reflecting optical member (e.g., a prism) which deflects the light beam incident from the object.

[4] The optical unit 14 according to [1], [2], or [3] is characterized in that the light amount adjustment mechanism 120 is arranged in the light amount adjustment unit SU near the coupling surface to the lens unit LU.

In the optical unit 14, the light amount adjustment mechanism 120 is arranged in the light amount adjustment unit SU near the coupling surface to the lens unit LU. Hence, when the light amount adjustment unit SU and lens unit LU are separated in doing inspection or the like, the light amount adjustment mechanism 120 appears on the coupling surface. Hence, check or modification can very easily be executed.

[5] The optical unit 14 according to any one of [1] to [4] is characterized in that in a state wherein the light amount adjustment unit SU and lens unit LU are integrally coupled, the light amount adjustment actuator unit 150 and lens driving actuator unit 250 are arranged along a linear region that is substantially parallel to the direction of the optical axis OB of the lens group 22.

In the optical unit 14, since the light amount adjustment actuator unit 150 and lens driving actuator unit 250 are arranged together aside of the optical axis OB, the mounting efficiency increases, contributing to the reduction in size and thickness.

[6] The optical unit 14 according to any one of [1] to [5] is characterized in that the second case 60 has, at the coupling portion to be coupled to the first case 30, the positioning members 71 to 73 to position the optical member (21) accommodated in the first case 30.

In the optical unit 14, when the first case 30 and second case 60 are coupled, the optical member (21) accommodated in the first case 30 is also positioned simultaneously. For this reason, positioning of the optical member (21) need not be separately executed, and the assembly is simplified. In addition, since the optical member (21) accommodated in the first case 30 is positioned by the positioning members 71 to 73 provided on the second case 60, the optical axis of the optical member (21) of the light amount adjustment unit SU can easily be aligned to the optical axis of the lens group 22 of the lens unit LU.

[7] The optical unit 14 according to [6] is characterized in that the positioning members 71 to 73 provided in the second case 60 also serve as positioning members between cases to position the first case 30 and second case 60.

In the optical unit 14, when the first case 30 and second case 60 are coupled, the optical member (21) accommodated in the first case 30 is positioned, and simultaneously, the two case members are also positioned. For this reason, the assembly is further simplified. In addition, since no new positioning members are particularly required, the number of components can be reduced.

[8] The optical unit 14 according to [7] is characterized in that the positioning members 71 to 73 comprise projecting portions which project along the direction of the optical axis OB, the first case 30 has the insertion portions (hole portions or groove portions) 41 to 43 which receive the projecting portions, and the optical member (21) has the engaging portions 91 to 93 which engage with the projecting portions inserted into the insertion portions 41 to 43.

[9] The optical unit 14 is characterized by comprising the light amount adjustment unit SU having an optical member (21) which receives a light beam from an object, the light amount adjustment mechanism 120 to adjust the light amount of the light beam received by the optical member (21), and the first case 30 which accommodates the optical member (21) and light amount adjustment mechanism 120, the lens unit LU having the lens group 22 which is movably arranged to obtain an object image from the light beam whose light amount is adjusted by the light amount adjustment mechanism 120, and the second case 60 which accommodates the lens group 22, the coupling means CM, arranged between the first case 30 and the second case 60, for detachably coupling the light amount adjustment unit SU and lens unit LU, and the positioning members 71 to 73 arranged at the coupling portion of the second case 60 so as to position the optical member (21) accommodated in the first case 30 when the first case 30 and second case 60 are coupled by the coupling means CM.

The arrangement of the light amount adjustment unit SU according to the present invention will be described next in more detail with reference to figures from FIG. 8.

Figures 8, 9:
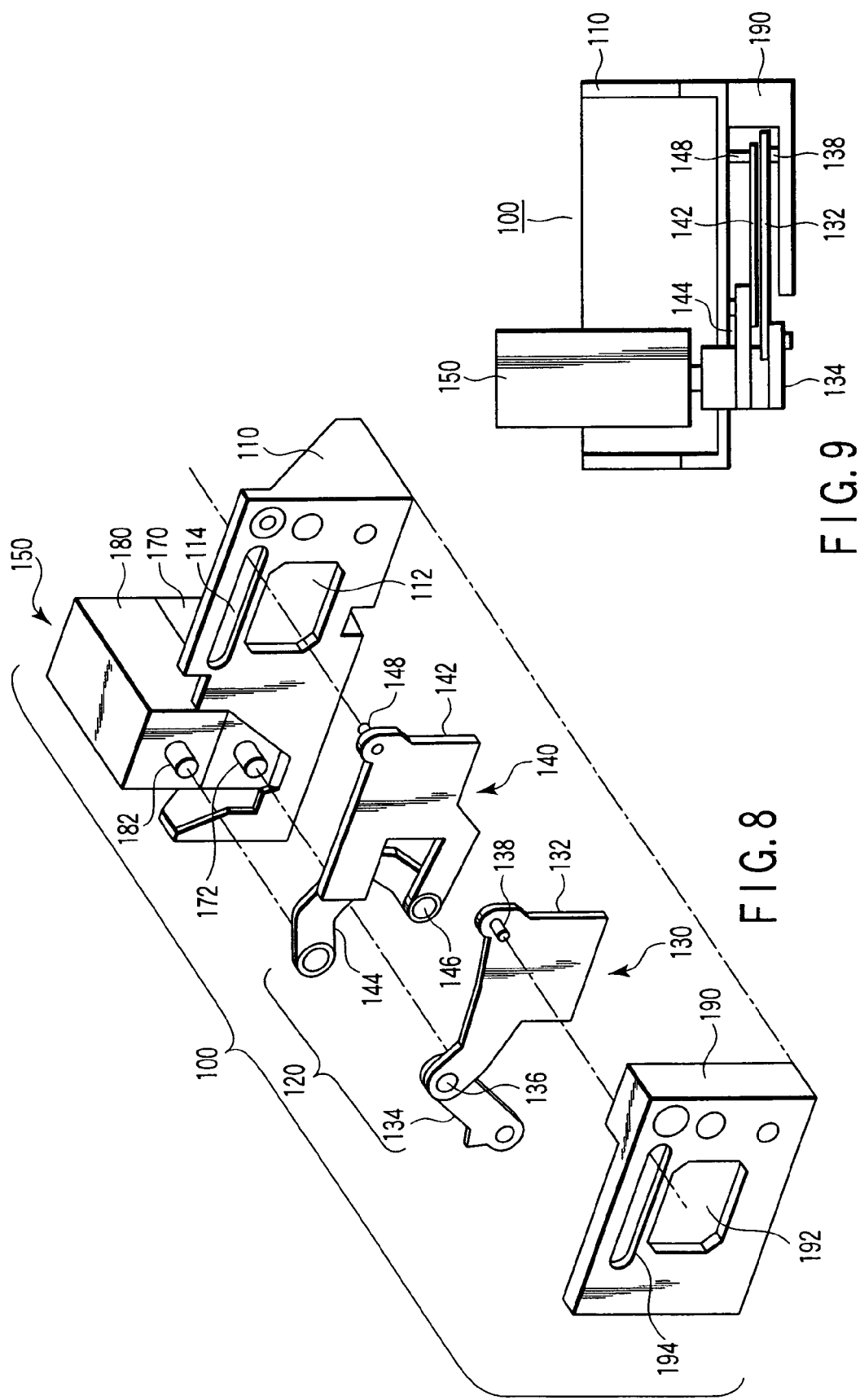
FIG. 8 is an exploded perspective view showing the arrangement of a light amount adjustment device in the light amount adjustment unit.
FIG. 9 is a plan view showing the assembled state of the light amount adjustment device in the light amount adjustment unit.

FIG. 8 is an exploded perspective view showing the arrangement of the light amount adjustment device 100 in the light amount adjustment unit SU excluding the optical system. The light amount adjustment device 100 has a base 110, the light amount adjustment mechanism 120 including the shutter mechanism 130 and light amount limiting mechanism 140, the light amount adjustment actuator unit 150 to drive the light amount adjustment mechanism 120, and a cover 190.

The base 110 has an almost rectangular opening portion 112 to pass light and a guide groove 114 extending along one side of the opening portion 112. The cover 190 has an almost rectangular opening portion 192 to pass light and a guide groove 194 extending along one side of the opening portion 192, like the base 110. The base 110 and cover 190 are positioned and fixed such that the opening portions 112 and 192 are arranged along the same axis.

The light amount adjustment actuator unit 150 has the first actuator 170 to drive the shutter mechanism 130 and the second actuator 180 to drive the light amount limiting mechanism 140. The light amount adjustment actuator unit 150 is located aside of the opening portion 112 and fixed to the base 110.

The first actuator 170 has the driving shaft 172 which rotates within a predetermined angle range. The first actuator 170 can be constituted by, e.g., a rotary solenoid. Similarly, the second actuator 180 has the driving shaft 182 which rotates within a predetermined angle range. Such a second actuator 180 can be constituted by, e.g., a rotary solenoid.

The first actuator 170 and second actuator 180 are arranged adjacent to each other. In this embodiment, the first actuator 170 and second actuator 180 are stacked in the vertical direction and integrated.

The shutter mechanism 130 has a light shielding member 132 to shield light and a lever 134 which has an almost linear shape and is connected to the light shielding member 132. One end portion of the lever 134 is connected to the light shielding member 132 through a shaft 136. The opposite end portion of the lever 134 is fixed to the driving shaft 172 of the first actuator 170.

The shutter mechanism 130 also has a guide pin 138 fixed on the light shielding member 132. The guide pin 138 is inserted to the guide groove 194 of the cover 190. The engagement between the guide pin 138 and guide groove 194 regulates the moving direction of the light shielding member 132 (i.e., guides the light shielding member 132).

When the driving shaft 172 of the first actuator 170 rotates within the predetermined angle range, the lever 134 turns. The turn of the lever 134 is converted into the linear movement of the light shielding member 132 by the connection between the lever 134 and the light shielding member 132 and the engagement between the guide pin 138 and the guide groove 194. That is, the light shielding member 132 moves along the guide groove 194 as the driving shaft 172 of the first actuator 170 rotates, i.e., as the lever 134 turns.

The light amount limiting mechanism 140 has a light amount limiting member 142 to attenuate light and a lever 144 which has an almost U shape and is connected to the light amount limiting member 142. The light amount limiting member 142 is, e.g., an attenuation filter which is formed from an optically transparent member having an appropriate transmittance. One end portion of the lever 144 is connected to the light amount limiting member 142 through a shaft 146. The opposite end portion of the lever 144 is fixed to the shaft 182 of the second actuator 180.

The light amount limiting mechanism 140 also has a guide pin 148 fixed on the light amount limiting member 142. The guide pin 148 is inserted to the guide groove 114 of the base 110. The engagement between the guide pin 148 and guide groove 114 regulates the moving direction of the light amount limiting member 142 (i.e., guides the light amount limiting member 142).

When the driving shaft 182 of the second actuator 180 rotates within the predetermined angle range, the lever 144 turns. The turn of the lever 144 is converted into the linear movement of the light amount limiting member 142 by the connection between the lever 144 and the light amount limiting member 142 and the engagement between the guide pin 148 and the guide groove 114. That is, the light amount limiting member 142 moves along the guide groove 114 as the shaft 182 of the second actuator 180 rotates, i.e., as the lever 144 turns.

FIG. 9 is a plan view showing the assembled state of the light amount adjustment device 100 in the light amount adjustment unit SU. As shown in FIG. 9, the shutter mechanism 130 and light amount limiting mechanism 140 are arranged while being shifted back and forth along the shafts of the actuators such that the operations of the two mechanisms do not interfere with each other, i.e., the operation of one of the mechanisms does not influence the operation of the other mechanism.

The operation of the light amount adjustment device 100 according to this embodiment will be described next with reference to FIGS. 10A, 10B, 11A, 11B, 12A, 12B, 13A, and 13B.

FIGS. 10A to 13B show the combinations of the open/closed states of the shutter mechanism 130 and light amount limiting mechanism 140. FIGS. 10A, 11A, 12A, and 13A (figures on the upper side) particularly show the positional relationship between the opening portion 112 and the light shielding member 132 of the shutter mechanism 130. Hence, the light amount limiting mechanism 140 is not illustrated. FIGS. 10B, 11B, 12B, and 13B (figures on the lower side) particularly show the positional relationship between the opening portion 112 and the light amount limiting member 142 of the light amount limiting mechanism 140. Hence, the shutter mechanism 130 is not illustrated.

Figure 10A:
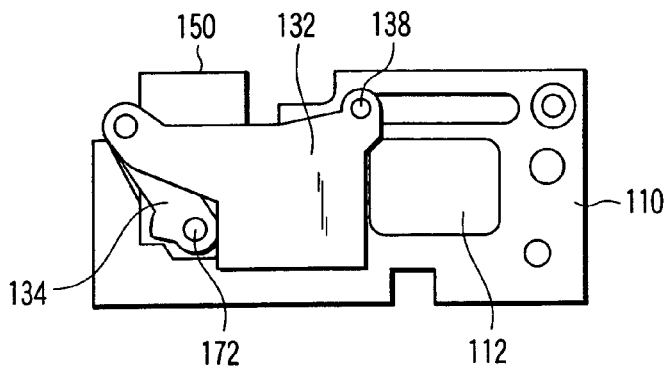
FIGS. 10A and 10B are explanatory views of the operation of the light amount adjustment device in which a shutter mechanism in an open state and a light amount limiting mechanism in an open state are illustrated in correspondence with each other.
Figure 10B:
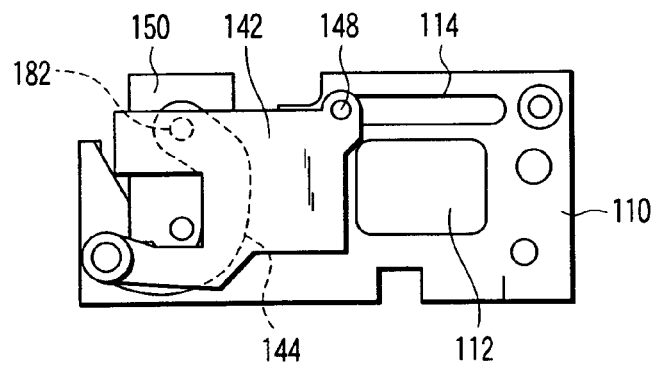
Figure 11A:
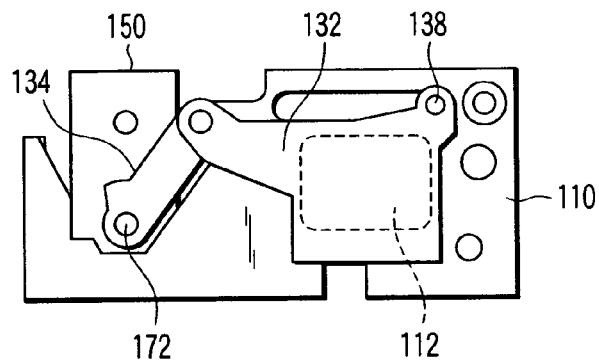
FIGS. 11A and 11B are explanatory views of the operation of the light amount adjustment device in which the shutter mechanism in a closed state and the light amount limiting mechanism in the open state are illustrated in correspondence with each other.
Figure 11B:
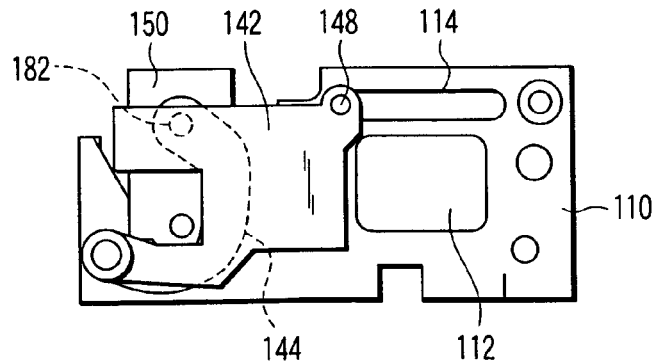

In a normal photographing mode, the light amount limiting mechanism 140 is set to the open state, as shown in FIGS. 10B and 11B. More specifically, the light amount limiting member 142 retreats from the opening portion 112 (and opening portion 192).

At the preparation for photographing, the shutter mechanism 130 is set to the open state, as shown in FIG. 10A. More specifically, the light shielding member 132 retreats from the opening portion 112 (and opening portion 192). Immediately after photographing, the shutter mechanism 130 is switched to the closed is state, as shown in FIG. 11A. More specifically, the light shielding member 132 closes the opening portion 112 (and opening portion 192). After a predetermined time, the shutter mechanism 130 is returned to the open state again, as shown in FIG. 10A. More specifically, the light shielding member 132 is returned to the retreat position from the opening portion 112 (and opening portion 192).

As described above, normal photographing is done by switching the shutter mechanism 130 and light amount limiting mechanism 140 from the states shown in FIGS. 10A and 10B to the states shown in FIGS. 11A and 11B and returning them to the states shown in FIGS. 10A and 10B.

Figure 12A:
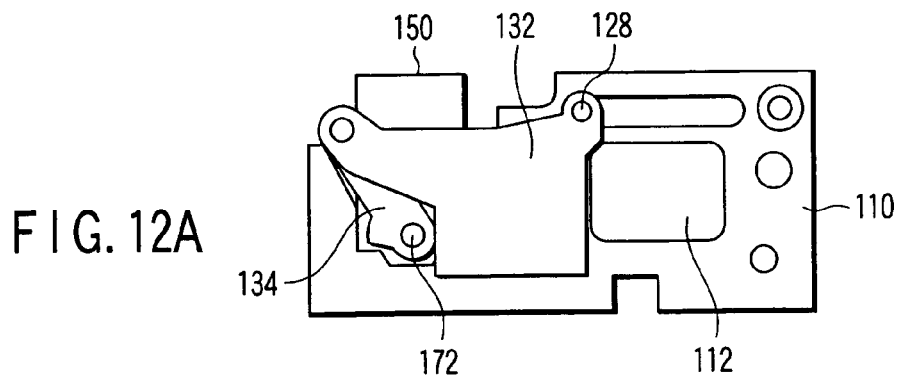
FIGS. 12A and 12B are explanatory views of the operation of the light amount adjustment device in which the shutter mechanism in the open state and the light amount limiting mechanism in a closed state are illustrated in correspondence with each other.
Figure 12B:
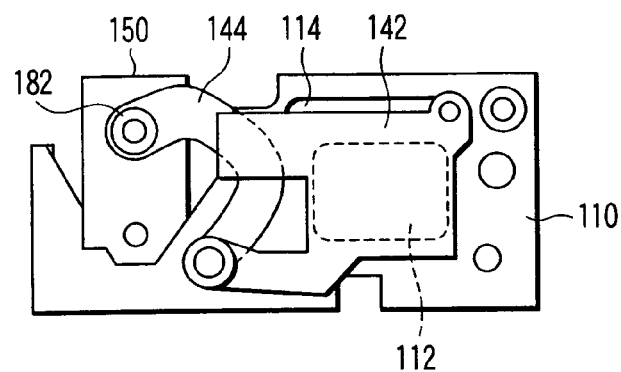
Figure 13A:
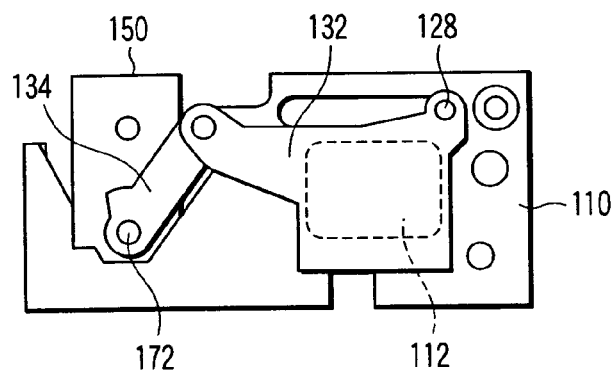
FIGS. 13A and 13B are explanatory views of the operation of the light amount adjustment device in which the shutter mechanism in the closed state and the light amount limiting mechanism in the closed state are illustrated in correspondence with each other.
Figure 13B:
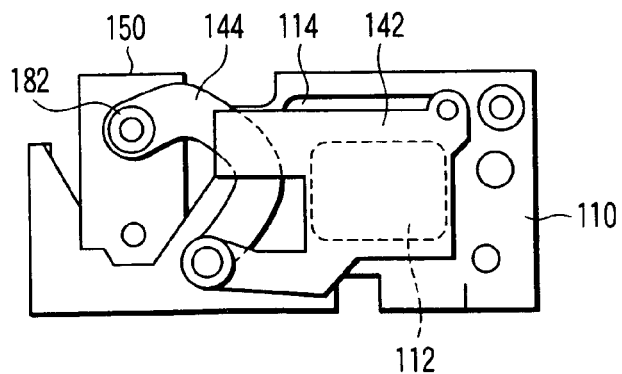

When the light amount needs to be decreased, the light amount limiting mechanism 140 is switched to the closed state, as shown in FIGS. 12B and 13B. In other words, in a photographing mode with attenuation, the light amount limiting mechanism 140 is set to the closed state. More specifically, the light amount limiting member 142 is moved to the position to close the opening portion 112 (and opening portion 192).

At the preparation for photographing, the shutter mechanism 130 is set to the open state, as shown in FIG. 12A. More specifically, the light shielding member 132 retreats from the opening portion 112 (and opening portion 192). Immediately after photographing, the shutter mechanism 130 is switched to the closed state, as shown in FIG. 13A. More specifically, the light shielding member 132 closes the opening portion 112 (and opening portion 192). After a predetermined time, the shutter mechanism 130 is returned to the open state again, as shown in FIG. 12A. More specifically, the light shielding member 132 is returned to the retreat position from the opening portion 112 (and opening portion 192).

That is, photographing with attenuation is done by switching the shutter mechanism 130 and light amount limiting mechanism 140 from the states shown in FIGS. 12A and 12B to the states shown in FIGS. 13A and 13B and returning them to the states shown in FIGS. 12A and 12B.

As is apparent from the above description, the shutter mechanism 130 according to this embodiment is designed to slide the light shielding member 132 in the horizontal direction. Similarly, the light amount limiting mechanism 140 is designed to slide the light amount limiting member 142 in the horizontal direction. For this reason, the vertical size of the light amount adjustment device 100 is suppressed small.

The two actuators 170 and 180 according to this embodiment are arranged adjacent (e.g., stacked in the vertical direction) aside of the opening portion. In other words, the two actuators 170 and 180 are arranged at the same horizontal position with respect to the opening portion 112. For this reason, the horizontal size of the light amount adjustment device 100 is suppressed small.

The arrangement of the light amount adjustment actuator unit 150 according to the present invention will be described next in more detail with reference to figures from FIG. 14.

Figure 14:
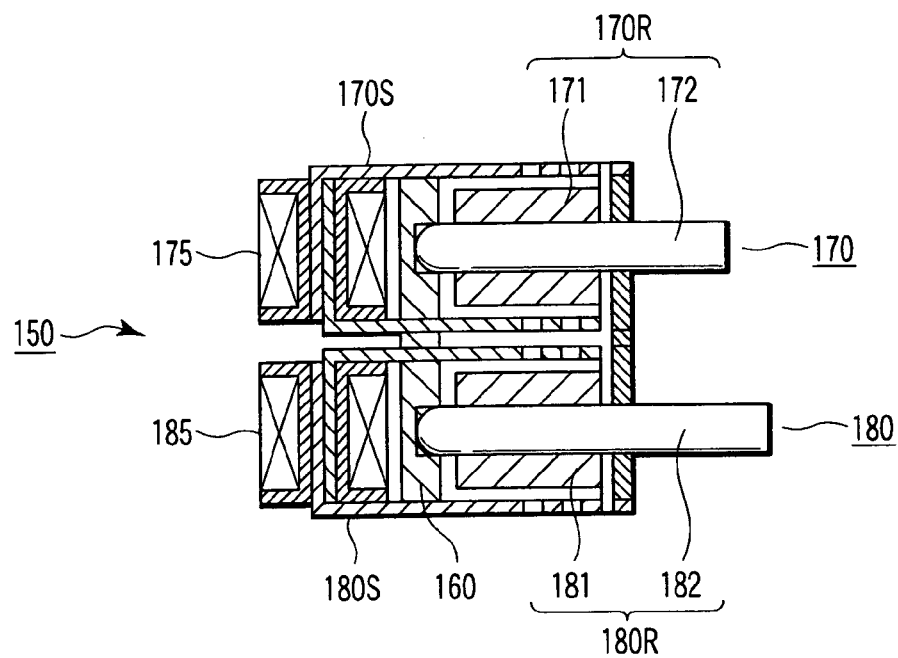
FIG. 14 is a longitudinal sectional view showing the arrangement of a light amount adjustment actuator unit in the optical unit.
Figure 15:
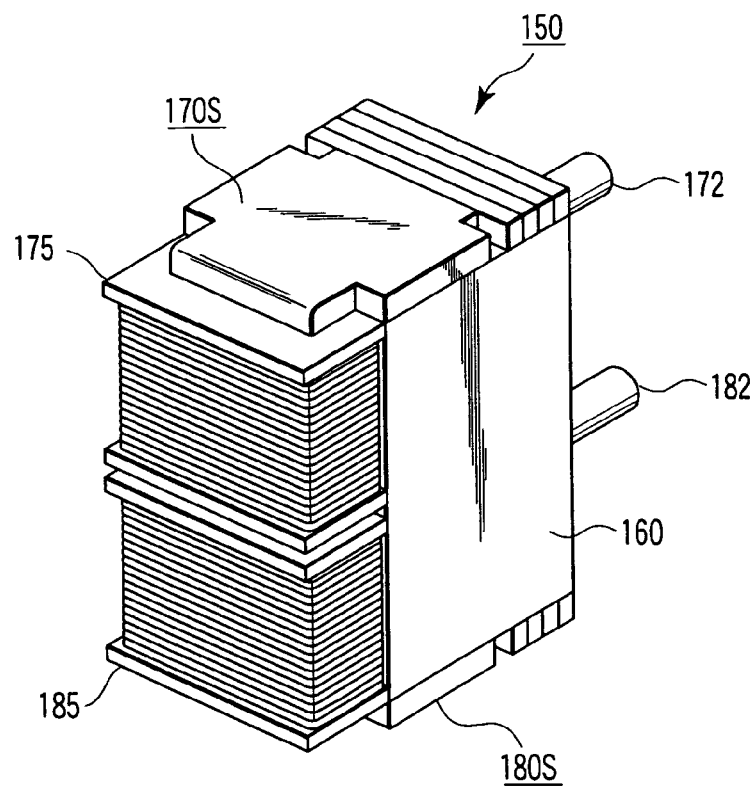
FIG. 15 is a perspective view showing the outer appearance of the light amount adjustment actuator unit is in the optical unit.

FIG. 14 is a longitudinal sectional view showing the arrangement of the light amount adjustment actuator unit 150. FIG. 15 is a perspective view showing the outer appearance of the light amount adjustment actuator unit 150. FIG. 16 is an exploded perspective view showing the arrangement of the light amount adjustment actuator unit 150. FIGS. 17A to 17C are views showing the arrangement of the actuator case of the light amount adjustment actuator unit 150, in which FIG. 17A is a view showing the left end face, FIG. 17B is a sectional view taken along a line 17B-17B in FIG. 17A, and FIG. 17C is a view showing the right end face. FIG. 18 is a sectional view of a bearing member in the light amount adjustment actuator unit 150. FIG. 19 is a sectional view of an exciting coil unit in the light amount adjustment actuator unit 150.

As shown in FIGS. 14 and 15, in the light amount adjustment actuator unit 150, the first actuator 170 comprising a first rotor unit 170R and first stator unit 170S and the second actuator 180 comprising a second rotor unit 180R and second stator unit 180S are accommodated and held adjacent in an actuator case 160 having a rectangular cylindrical shape.

As shown in FIGS. 16 and 17A to 17C, a first opening portion 161 to which internal stator members are to be attached is formed in a surface (the left surface in FIG. 16) of the actuator case 160 on a side opposite to the surface through which the rotating shafts 172 and 182 of the first and second rotor units 170R and 180R extend. Second and third opening portions 162 and 163 to which external stator members are to be attached are formed in two surfaces (the upper and lower surfaces in FIG. 16) of the actuator case 160, which are perpendicular to the surface having the first opening portion 161. In addition, the actuator case 160 has bearing member attachment holes 164 and 165 in a surface (the right surface in FIG. 16) through which the rotating shafts 172 and 182 extend.

Guide portions (grooves are used in this embodiments, though the guide portions may be projections) 166a and 166b serving as holding portions that guide and hold both sides of internal stator members 173 and 183 (to be described later) are formed inside (in both internal side surfaces parallel to the rotor rotating shafts) of the actuator case 160. In addition, bearing portions 167 and 168 which support ends 172a and 182a of the pair of rotor rotating shafts 172 and 182 (to be described later) are arranged inside (in the internal side surface having the first opening portion 161) of the actuator case 160.

Positioning portions 169a and 169b which position an external stator member 174 (to be described later) are formed on the end face of the second opening portion 162 of the actuator case 160. In addition, positioning portions 169c and 169d which position an external stator member 184 are formed on the end face of the third opening portion 163 of the actuator case 160. All the positioning portions 169a, 169b, 169c, and 169d have a pin shape.

The first rotor unit 170R of the first actuator 170 comprises a rotor 171 made of a permanent magnet and the rotating shaft 172 of the rotor 171. One end 172a of the rotating shaft 172 is rotatably supported by the bearing portion 167 formed inside the actuator case 160. The other end 172b of the rotor rotating shaft 172 is rotatably supported by a bearing hole 176a of a bearing member 176 (FIG. 18) which is fitted in the bearing member attachment hole 164 formed in a side wall of the actuator case 160. An outer peripheral portion 176b of the bearing member 176 has a step portion having two, large and small outer diameters adapted to the step portion of the bearing member attachment hole 164.

The second rotor unit 180R of the second actuator 180 comprises a rotor 181 made of a permanent magnet and the rotating shaft 182 of the rotor 181. One end 182a of the rotating shaft 182 is rotatably supported by the bearing portion 168 formed inside the actuator case 160. The other end 182b of the rotor rotating shaft 182 is rotatably supported by a bearing hole 186a of a bearing member 186 (FIG. 18) which is fitted in the bearing member attachment hole 165 formed in a side wall of the actuator case 160. An outer peripheral portion 186b of the bearing member 186 has a step portion having two, large and small outer diameters adapted to the step portion of the bearing member attachment hole 165.

The first stator unit 170S of the first actuator 170 has the internal stator member 173 having a magnetic pole portion 173e at one end, the external stator member 174 having a magnetic pole portion 174e at one end, and an exciting coil unit 175.

The second stator unit 180S of the second actuator 180 has the internal stator member 183 having a magnetic pole portion 183e at one end, the external stator member 184 having a magnetic pole portion 184e at one end, and an exciting coil unit 185.

FIG. 20 is an exploded perspective view showing the arrangement of the internal stator member 173 and external stator member 174 in the first stator unit 170S. The arrangement of the internal stator member 183 and external stator member 184 in the second stator unit 180S is the same as that in the first stator unit 170S, and an illustration and description thereof will be omitted.

As shown in FIG. 20, the internal stator member 173 has the magnetic pole portion 173e at one end (the right end in FIG. 20) of a base plate BP. The base plate BP is formed by being a magnetic member into an almost L shape. As part of the magnetic pole portion 173e, a stacked core C1 of a first layer L1 is formed at the front end portion (the right end in FIG. 20) of the base plate BP. Stacked cores C2 to C5 of second to fifth layers L2 to L5 have the same shape as the stacked core C1 and are integrally stacked and coupled to the stacked core C1 of the first layer L1. Each stacked core has a magnetic pole F on one side surface of a bar piece H that extends linearly. The magnetic pole F is formed as a semicircular notch portion with a central portion surrounding the rotor outer surface. Projecting portions E serving as attachment pieces to the guide portions and the opening portions of the actuator case 160 are formed at both ends of the bar piece H. In addition, a pair of projecting and recess portions V serving as stacking engaging portions are formed on the front and rear surfaces of the bar piece H in correspondence with each other.

The basic arrangement of the external stator member 174 is the same as the internal stator member 173. However, to assemble the internal stator member 173 and external stator member 174 opposed to each other, as shown in FIG. 20, a rear end portion 174f of the base plate BP of the external stator member 174 is shifted outward from a rear end portion 173f of the internal stator member 173 by a distance G corresponding to the thickness of the plate BP.

The base plate BP of the internal stator member 173 and the base plate BP of the external stator member 174 have attachment threaded holes 173c and 173d, and 174c and 174d, respectively, which are used to attach the base plates to the case 30 of the light amount adjustment unit SU.

Referring back to FIG. 16, a portion including at least the magnetic pole portion 173e of the internal stator member 173 of the first stator unit 170S and a portion including at least the magnetic pole portion 183e of the internal stator member 183 of the second stator unit 180S are inserted into the actuator case 160 through the first opening portion 161. At this time, the internal stator members 173 and 183 are inserted while their rear surface portions are set close to each other. The members 173 and 183 are smoothly inserted as their sides are guided along the guide portions 166a and 166b formed inside the actuator case 160.

The magnetic pole portion 173e inserted into the actuator case 160 is arranged to surround a part of the outer surface of the rotor 171. Similarly, the magnetic pole portion 183e inserted into the actuator case 160 is arranged to surround a part of the outer surface of the rotor 181.

The exciting coil unit 175 is fitted on the rear end portion 173f of the internal stator member 173 attached to the actuator case 160, which is exposed from the actuator case 160. Similarly, the exciting coil unit 185 is fitted on a rear end portion 183f of the internal stator member 183 attached to the actuator case 160, which is exposed from the actuator case 160.

As shown in FIG. 19, the exciting coil units 175 and 185 are formed by winding coils 175b and 185b on bobbins 175a and 185a, respectively.

The external stator member 174 of the first stator unit 170S is attached to cover the second opening portion 162. At this time, the rear end portion 174f of the external stator member 174 is inserted into the hollow portion of the exciting coil unit 175 to overlap the rear end portion 173f of the internal stator member 173. Furthermore, positioning holes 174a and 174b formed in the external stator member 174 engage with the positioning portions 169a and 169b of the actuator case 160, respectively. The head portions of the positioning portions 169a and 169b having a pin shape are thermally caulked and fixed, as needed.

Similarly, the external stator member 184 of the second stator unit 180S is attached to cover the third opening portion 163. At this time, the rear end portion 184f of the external stator member 184 is inserted into the hollow portion of the exciting coil unit 185 to overlap the rear end portion 183f of the internal stator member 183. Furthermore, positioning holes 184a and 184b formed in the external stator member 184 engage with the positioning portions 169c and 169d of the actuator case 160, respectively. The head portions of the positioning portions 169c and 169d having a pin shape are thermally caulked and fixed, as needed.

The rear end portion 173f of the internal stator member 173 and the rear end portion 174f of the external stator member 174, which are inserted into the hollow portion of the exciting coil unit 175 to overlap each other, are magnetically connected to each other. Similarly, the rear end portion 183f of the internal stator member 183 and the rear end portion 184f of the external stator member 184, which are inserted into the hollow portion of the exciting coil unit 185 to overlap each other, are magnetically connected to each other.

Figure 21:
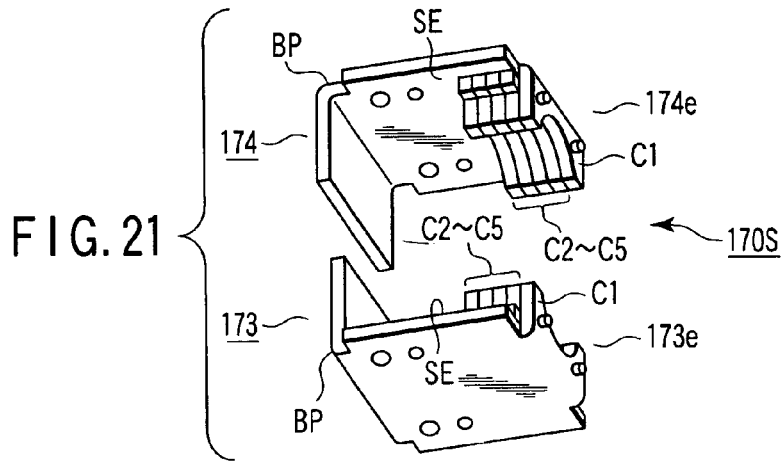
FIG. 21 is an exploded perspective view showing a modification of the internal and external stator members of the first stator member in the light amount adjustment actuator unit.

FIG. 21 is an exploded perspective view showing a modification of the internal stator member 173 and external stator member 174 of the first stator unit 170S shown in FIG. 20. The first stator unit 170S of this modification is different from the first stator unit 170S shown in FIG. 20 in the following point. For each of the magnetic pole portions 173e and 174e of the internal stator member 173 and external stator member 174 in this modification, the stacked cores C2 to C5 of the second to fifth layers L2 to L5 integrally stacked are connected to the inside (the left side in FIG. 21) of the stacked core C1 of the first layer L1 formed on the base plate BP.

In this arrangement, the attachment pieces to the guide portions and the opening portions of the case 160 can be formed from only both edges SE of the base plate BP of the internal stator member 173 and external stator member 174, respectively. The projecting portions E serving as the attachment pieces need not be formed on the stacked cores. Hence, the arrangement can be simplified and easily manufactured. The remaining parts are the same as in the first embodiment, and a description thereof will be omitted.

The above-described light amount adjustment actuator unit 150 and the optical unit 14 having the unit 150 have the following characteristic features.

[11] The light amount adjustment actuator unit 150 is characterized by comprising the actuator case 160, the first actuator 170 comprising the first rotor unit 170R and first stator unit 170S, which are accommodated and held in the actuator case 160, and the second actuator 180 comprising the second rotor unit 180R and second stator unit 180S, which are accommodated and held in the actuator case 160 to be adjacent to the first actuator 170, wherein the first stator unit 170S comprises the internal stator member 173 having the magnetic pole portion 173e and the external stator member 174 having the magnetic pole portion 174e, the second stator unit 180S comprises the internal stator member 183 having the magnetic pole portion 183e and the external stator member 184 having the magnetic pole portion 184e, the actuator case 160 has the first opening portion 161 to which the internal stator members are to be attached and which is formed in one surface (in the embodiment, a surface on a side opposite to the surface through which the rotating shafts 172 and 182 of the first and second rotor units 170R and 180R extend), and the second and third opening portions 162 and 163 to which the external stator members are to be attached and which are formed in two surfaces perpendicular to the surface having the first opening portion 161, the internal stator member 173 of the first stator unit 170S and the internal stator member 183 of the second stator unit 180S are inserted into the actuator case 160 through the first opening portion 161 while the magnetic pole portions 173e and 183e are attached to surround a part of the outer surface of the rotor 171 of the first rotor unit 170R and a part of the outer surface of the rotor 181 of the second rotor unit 180R, respectively, and the external stator member 174 of the first stator unit 170S and the external stator member 184 of the second stator unit 180S are attached to cover the second and third opening portions 162 and 163, respectively, while the magnetic pole portions 173e and 183e are attached to surround the remaining part of the outer surface of the rotor 171 of the first rotor unit 170R and the remaining part of the outer surface of the rotor 181 of the second rotor unit 180R, respectively.

In the light amount adjustment actuator unit 150, the first actuator 170 and second actuator 180, which are set close to each other, are very compactly arranged in the actuator case 160. For this reason, the space factor is very high, and the space occupied by the actuators 170 and 180 can be minimized.

[12] The light amount adjustment actuator unit 150 according to [11] is characterized in that the rear end portion 173f of the internal stator member 173 and the rear end portion 174f of the external stator member 174 in the first stator unit 170S, which are exposed from the actuator case 160, are magnetically coupled, and the rear end portion 183f of the internal stator member 183 and the rear end portion 184f of the external stator member 184 in the second stator unit 180S, which are exposed from the actuator case 160, are magnetically coupled.

In the light amount adjustment actuator unit 150, since the rear end portions which are exposed from the actuator case 160 are magnetically coupled, manufacturing and assembly become easy.

[13] The light amount adjustment actuator unit 150 according to [11] or [12] is characterized in that the guide portions 166a and 166b to hold the internal stator members 173 and 183 are formed in the actuator case 160.

[14] The light amount adjustment actuator unit 150 according to [11], [12], or [13] is characterized in that the internal stator member 173 of the first stator unit 170S and the internal stator member 183 of the second stator unit 180S are attached to the inside of the actuator case 160 while setting their rear surface portions close to each other.

In the light amount adjustment actuator unit 150, the internal stator member 173 and internal stator member 183 are assembled in a so-called back-to-back manner. For this reason, formation of any dead space is efficiently suppressed, and the space factor improves.

[15] The light amount adjustment actuator unit 150 according to any one of [11] to [14] is characterized in that the positioning portions 169a and 169b to position the external stator member 174 are formed at the second opening portion 162 of the actuator case 160, and the positioning portions 169c and 169d to position the external stator member 184 are formed at the third opening portion 163 of the actuator case 160.

[16] The light amount adjustment actuator unit 150 according to [15] is characterized in that the positioning portions 169a and 169b and the positioning portions 169c and 169d have a pin shape and are designed to engage with the positioning holes 174a and 174b and positioning holes 184a and 184b formed in the external stator members 174 and 184, respectively, and allow thermal caulking.

[17] The light amount adjustment actuator unit 150 according to any one of [11] to [16] is characterized in that at least part of each of the magnetic pole portions 173e, 174e, 183e, and 184e of the internal stator members 173 and 183 and external stator members 174 and 184 is formed by a stacked core.

In the light amount adjustment actuator unit 150, at least part of each of the magnetic pole portions 173e, 174e, 183e, and 184e of the internal stator members 173 and 183 and external stator members 174 and 184 is formed by a stacked core. For this reason, generation of an eddy current is suppressed, and the energy efficiency as a motor-driven mechanism greatly increases.

[18] The light amount adjustment actuator unit 150 according to any one of [11] to [17] is characterized in that the attachment threaded holes 174c, 174d, 184c, and 184d to the external case (30) are formed on at least one of the external stator member 174 of the first stator unit 170S and the external stator member 184 of the second stator unit 180S.

[19] The light amount adjustment actuator unit 150 according to any one of [11] to [18] is characterized in that the bearing portions 167 and 168 which support the ends of the rotating shafts 172 and 182 of the pair of rotor units 170R and 180R are arranged in the actuator case 160.

[20] The light amount adjustment actuator unit 150 according to any one of [11] to [19] is characterized in that in the light amount adjustment device 100 having the shutter mechanism 130 which appropriately closes the opening portion 112 that passes light and the light amount limiting mechanism 140 which limits the amount of light that passes through the opening portion, each of the first and second actuators 170 and 180 drives either shutter mechanism 130 or light amount limiting mechanism 140.

[21] The optical unit 14 characterized by comprising the light amount adjustment unit SU including the light amount adjustment actuator unit 150 of any one of [11] to [20], and the lens unit LU including the lens group 22 which is arranged to be movable in the direction of the optical axis along the guide shafts 224 and 225 and the lens driving actuator unit 250 which drives and moves the lens group 22 to a predetermined position in the direction of an optical axis.

[22] The optical unit 14 according to [21] is characterized in that the lens unit LU has the plurality of (two) lens groups 22V and 22F which are arranged to be movable in the direction of the optical axis, and the plurality of (two) lens groups 22V and 22F are driven and controlled by the plurality of (two) lens driving actuators 300 and 400 arranged in correspondence with the lens groups.

[23] The optical unit 14 according to [22] is characterized by further comprising the light amount adjustment actuator unit 150 comprising the plurality of (two) light amount adjustment actuators 170 and 180 in the light amount adjustment unit SU, and the lens driving actuator unit 250 comprising the plurality of (two) lens driving actuators 300 and 400 in the lens unit LU, and wherein the two actuator units 150 and 250 are arranged along a linear region that is substantially parallel to the direction of the optical axis of the lens group 22.

In the optical unit 14, since the plurality of (two) actuator units 150 and 250 are arranged together on the same side of the photographing optical system, no space is wastefully occupied.

[24] The optical unit 14 according to [23] is characterized in that the lens driving actuators 300 and 400 respectively comprise the shafts 301 and 401 rotatably supported, the rotors 300R and 400R each of which comprises a permanent magnet arranged on one side of a corresponding one of the shafts 301 and 401, and the stators 300S and 400S including exciting coils arranged around the rotors 300R and 400R, and the lens driving actuator unit 250 is arranged so that the shafts 301 and 401 of the lens driving actuators 300 and 400 are arranged in parallel, and portions having the rotors 300R and 400R and stators 300S and 400S are located on opposite sides.

In the optical unit 14, the shafts 301 and 401 of the lens driving actuators 300 and 400 which have relatively long forms are arranged together in a common region. In addition, the rotors 300R and 400R and stators 300S and 400S, which have a relatively large diameter, are arranged on opposite sides. Hence, the occupied space can be small.

[25] The optical unit 14 according to [23] or [24] is characterized in that the shafts 172 and 182 of the plurality of light amount adjustment actuators 170 and 180 in the light amount adjustment actuator unit 150 are arrayed in a first plane, and the shafts 301 and 401 of the plurality of lens driving actuators 300 and 400 in the lens driving actuator unit 250 are arrayed in a second plane parallel to the first plane.

In the optical unit 14, since the shafts 172, 182, 301 and 401 of the actuator units 150 and 250 are arranged in parallel, any wasteful space is hardly formed, and the structure can be made compact.

[26] The optical unit 14 according to any one of [21] to [25] is characterized by further comprising a reflecting optical member (prism 21) which deflects a light beam incident from an object along the is first optical axis OA to the direction of the second optical axis OB which is perpendicular to the first optical axis OA.

In the optical unit 14, since the optical axis is deflected midway, the depth, i.e., the thickness of the optical unit itself and, more particularly, the camera main body 10 can be decreased.

[27] The optical unit 14 according to [26] is characterized in that sizes LA2 and LA3 of the light amount adjustment actuator unit 150 and lens driving actuator unit 250 in the direction along the first optical axis OA are set to be substantially the same as a size LA1 of the reflecting optical member (prism 21) in the direction of the first optical axis OA.

In the optical unit 14, the thickness of the reflecting optical member (prism 21) almost equals the thickness of the portion of the actuator units 150 and 250. For this reason, the thickness of the entire optical unit 14 is uniformed.

[28] The optical unit 14 according to [16] is characterized in that the sizes LA2 and LA3 of the light amount adjustment actuator unit 150 and lens driving actuator unit 250 in the direction along the first optical axis OA are set to be approximate to each other.

In the optical unit 14, at least the two actuator units 150 and 250 can have a predetermined thickness.

The arrangement of the lens unit LU shown in FIGS. 3B and 4B will be described next in more detail with reference to figures from FIG. 22.

Figure 22:
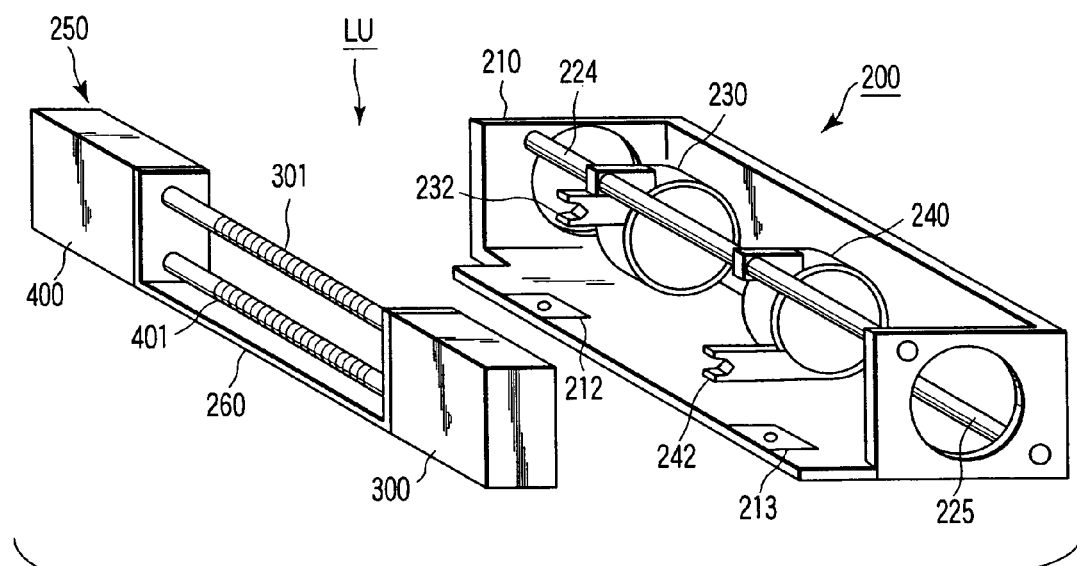
FIG. 22 is a perspective view separately showing a lens driving actuator unit in the optical unit and a lens-barrel in which the actuator unit is to be assembled.

FIG. 22 is a perspective view separately showing a lens-barrel 200 and the lens driving actuator unit 250 in the lens unit LU. The lens-barrel 200 has a lens-barrel base 210, two guide shafts 224 and 225, a variator lens frame 230 including the variator lens group (so-called zoom lenses) 22V, and a focusing lens frame 240 including the focusing lens group 22F.

The guide shafts 224 and 225 are arranged between the front and rear walls of the base 110. The variator lens frame 230 and focusing lens frame 240 are guided by the two guide shafts 224 and 225 and supported to be movable in the direction of the optical axis.

The lens driving actuator unit 250 includes the two stepping motors 300 and 400. The stepping motors 300 and 400 are held by a motor holder 260 having a U shape. The two driving shafts 301 and 401 of the two stepping motors 300 and 400 extend in parallel. A lead screw is formed in the surface of each shaft.

The variator lens frame 230 has a nut 232 which meshes with the lead screw of the shaft 301 of the first stepping motor 300. The focusing lens frame 240 has a nut 242 which meshes with the lead screw of the shaft 401 of the second stepping motor 400.

The lens driving actuator unit 250 is attached to the lens-barrel 200 by fixing the motor holder 260 to motor attachment portions 212 and 213 of the lens-barrel base 210 by fixing means such as screws while meshing the shaft 301 with the nut 232 and the shaft 401 with the nut 242.

The variator lens frame 230 moves along the guide shafts 224 and 225 as the stepping motor 300 rotates. That is, the variator lens frame 230 is moved back and forth in accordance with the direction of rotation of the shaft 301. Similarly, the focusing lens frame 240 moves along the guide shafts 224 and 225 as the stepping motor 400 rotates. That is, the focusing lens frame 240 is moved back and forth in accordance with the direction of rotation of the shaft 401.

Figure 23:
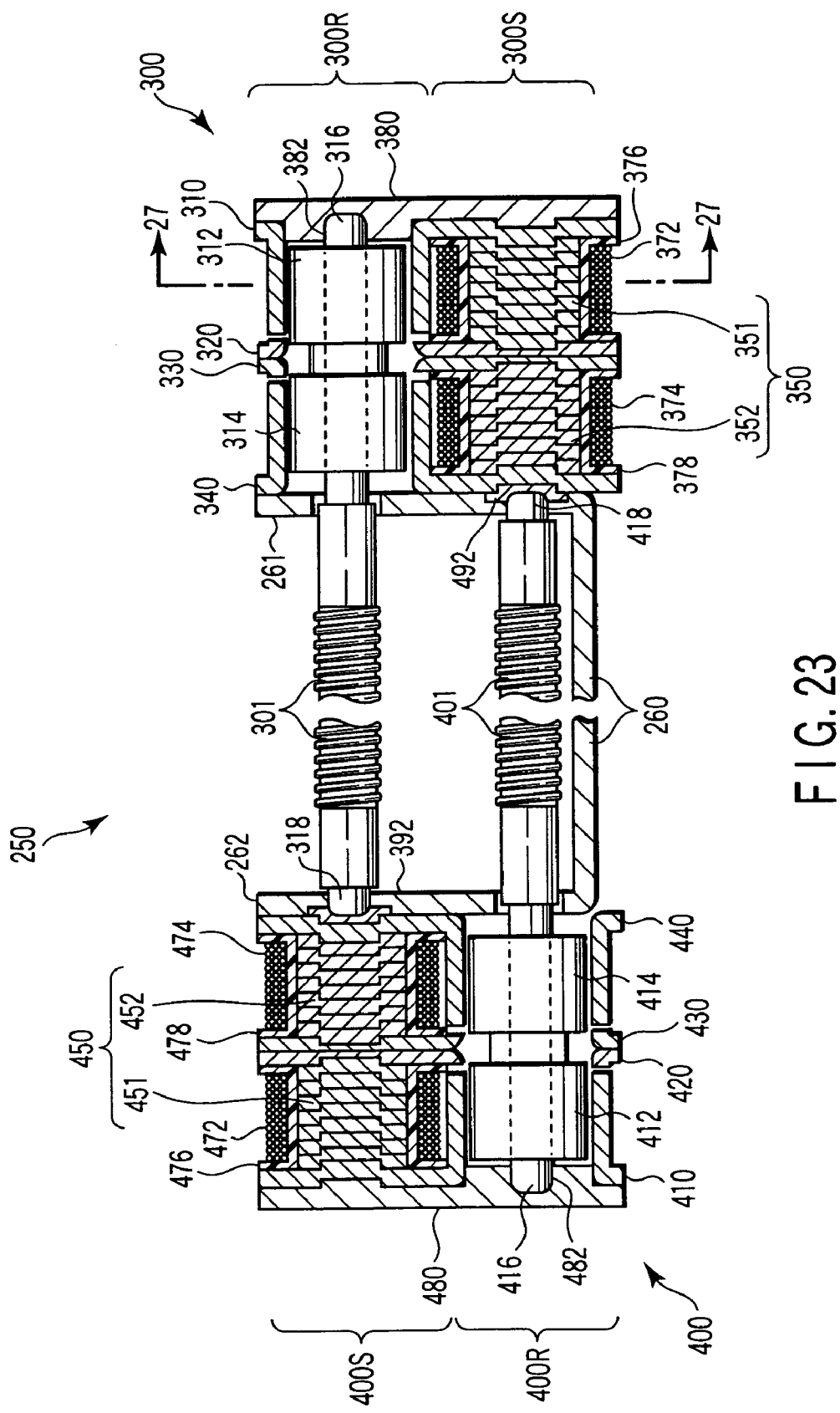
FIG. 23 is a longitudinal sectional view showing a detailed arrangement of the lens driving actuator unit.

The detailed structure of the lens driving actuator unit 250 will be described below in detail with reference to FIG. 23. Referring to FIG. 23, the members of the first stepping motor 300 are indicated by reference numerals in 300s, and the members of the second stepping motor 400 are indicated by reference numerals in 400s.

The first stepping motor 300 and second stepping motor 400 are integrally held by the single motor holder 260. Hence, assembly is easy. In addition, the lens driving actuator unit 250 is a finished product by itself. Hence, it can be separately subjected to performance inspection and then assembled with the lens-barrel and the like. Hence, an inexpensive stepping motor having a stable quality can be provided.

The first stepping motor 300 has one shaft 301 rotatably supported, the rotor 300R (comprising a first rotor 312 and second rotor 314 which are integrally formed) made of a permanent magnet arranged on one side of the shaft 301, and the stator 300S which rotates the rotor 300R.

The second stepping motor 400 has one shaft 401 rotatably supported, the rotor 400R (comprising a first rotor 412 and second rotor 414 which are integrally formed) made of a permanent magnet arranged on one side of the shaft 401, and the stator 400S which rotates the rotor 400R.

The shaft 301 of the first stepping motor 300 and the shaft 401 of the second stepping motor 400 are arranged in parallel. In addition, the first stepping motor 300 and second stepping motor 400 have the same structure and are arranged symmetrically. More specifically, the first rotor 312 and second rotor 314 of the first stepping motor 300 arranged on one side of the shaft 301 and the first rotor 412 and second rotor 414 of the second stepping motor 400 arranged on one side of the shaft 401 are located on opposite sides. That is, the axes of the shafts of the two stepping motors are parallel. For this reason, one of two bearings of one stepping motor is arranged on the axis of the rotor of its own. The other bearing is arranged aside the rotor of the other stepping motor. As compared to a structure in which two stepping motors are simply lined up, two bearings and their fixing portions are omitted. Hence, the lens driving actuator unit 250 according to this embodiment becomes compact.

The structure of the lens driving actuator unit 250 will be described below in more detail. Since the first stepping motor 300 and second stepping motor 400 have the same structure, the description will be done mainly in association with the first stepping motor 300. The detailed structure of the second stepping motor 400 can easily be understood by replacing reference numerals in 300s in the description with 400s.

The first stepping motor 300 has the rotor 300R including the shaft 301 rotatably supported, and the first and second rotors 312 and 314 which are formed from permanent magnets and arranged on one side of the shaft 301. The first stepping motor 300 also has the stator 300S including first and second coils 372 and 374 for magnetization control, which are arranged adjacent to the first and second rotors 312 and 314 in parallel to their axes, and stator cores 310 to 350 to be magnetization-controlled by the first and second coils 372 and 374.

The first coil 372 in the stator 300S is wound around a first bobbin 376. The first bobbin 376 has, at its central portion, a hollow portion capable of receiving a first main stator core 351 (to be described later). Similarly, the second coil 374 is wound around a second bobbin 378. The second bobbin 378 has, at its central portion, a hollow portion capable of receiving a second main stator core 352 (to be described later).

The stator core in the stator 300S has the main stator core 350. The main stator core 350 includes the first and second main stator cores 351 and 352 arranged in the first and second coils 372 and 374.

The stator core also has the first and second sub stator cores 310 and 320. The first and second sub stator cores 310 and 320 are located at two ends of the first rotor 312 in the axial direction. The first and second sub stator cores 310 and 320 are arranged around the rotor 312 such that the yoke portions are magnetically coupled to the first main stator core 351, and the pole portions having a comb-like shape apply a rotating magnetic field to the first rotor 312.

The stator core also has the third and fourth sub stator cores 330 and 340. The third and fourth sub stator cores 330 and 340 are located at two ends of the second rotor 314 in the axial direction. The third and fourth sub stator cores 330 and 340 are arranged around the rotor 314 such that the yoke portions are magnetically coupled to the second main stator core 352, and the pole portions having a comb-like shape apply a rotating magnetic field to the second rotor 314.

Figure 24:
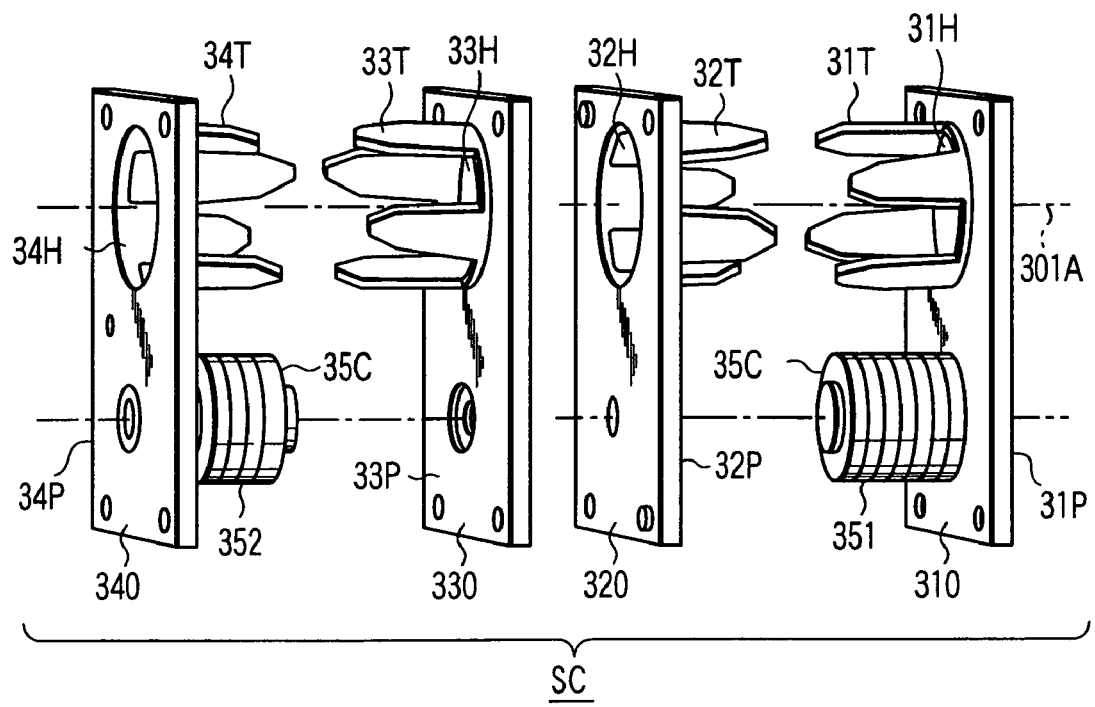
FIG. 24 is an exploded perspective view of a stator core included in one motor of the lens driving actuator unit.
Figure 25:
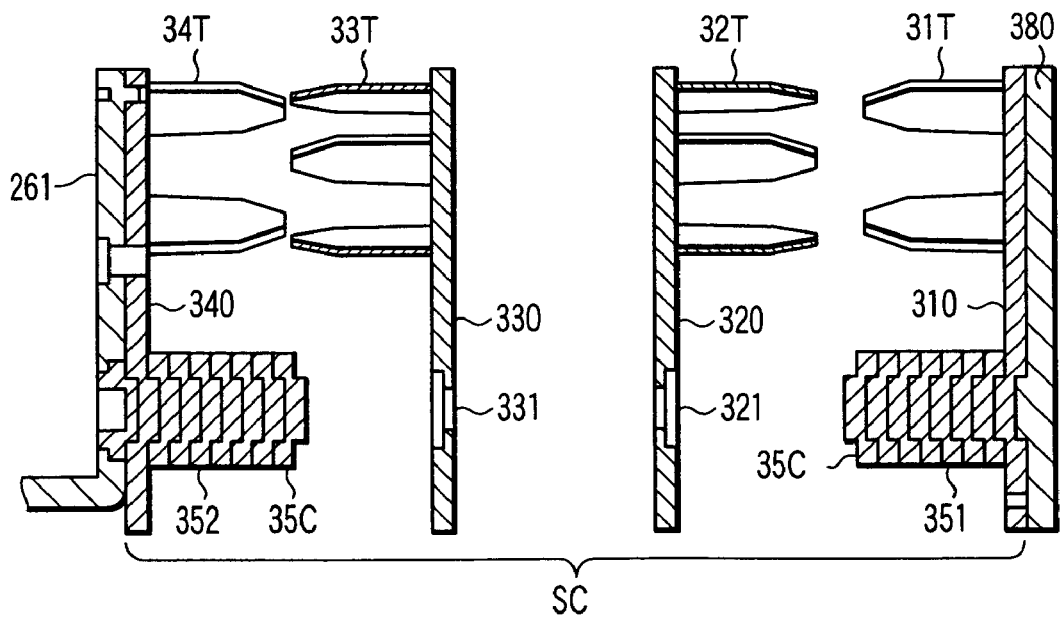
FIG. 25 is a sectional view showing the stator core included in one motor of the lens driving actuator unit in association with a holder support wall and end plate.
Figure 26:
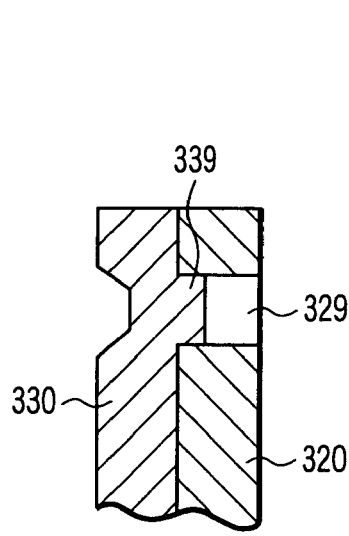
FIG. 26 is an enlarged sectional view showing the joint portion between second and third stator cores included in one motor of the lens driving actuator unit.
Figure 27:
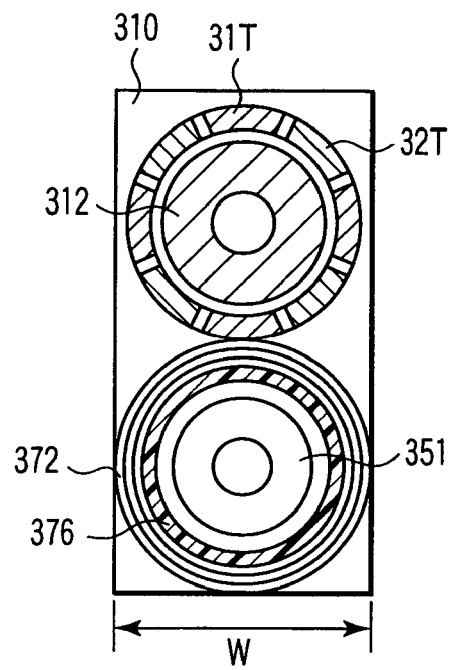
FIG. 27 is a sectional view showing the lens driving actuator unit taken along a line 27-27 in FIG. 23.

FIG. 24 is an exploded perspective view of a stator core SC (310 to 350) included in the stepping motor 300. FIG. 25 is a sectional view showing the stator core SC (310 to 350) in association with a holder support wall 261 and end plate 380. FIG. 26 is an enlarged sectional view showing the joint portion between the second sub stator core 320 and the third sub stator core 330. FIG. 27 is a sectional view of the lens driving actuator unit 250 shown in FIG. 23 taken along a line 27-27.

As shown in FIGS. 24 and 25, each of the first and second main stator cores 351 and 352 is formed by integrally stacking a plurality of core plates 35C and contact-bonding them to each other on their both surfaces. Each core plate 35C is formed by pressing, e.g., a silicon thin plate such that one surface of the disk-shaped core member has, at a portion (in this example, the central portion), a projecting portion corresponding to a recess portion of the other surface. Hence, when the recess portion of one core plate 35C is stacked on the projecting portion of another core plate 35C and press-fitted, the two core plates are contact-bonded.

The proximal end of the first main stator core 351 having the above-described multilayered structure is coupled and fixed to the first sub stator core 310 by the same contact bonding means as described above. The proximal end of the second main stator core 352 having the above-described multilayered structure is coupled and fixed to the fourth sub stator core 340 by the same contact bonding means as described above. The distal end of the first main stator core 351 having the multilayered structure is also coupled to an engaging hole 321 of the second sub stator core 320 by the same contact bonding means as described above at the final assembly. The distal end of the second main stator core 352 having the multilayered structure is also coupled to an engaging hole 331 of the third sub stator core 330 by the same contact bonding means as described above.

The first sub stator core 310 has a flat yoke portion 31P that extends across an axis 301A of the shaft 301, a circular opening 31H about the axis 301A of the shaft 301, and a plurality of pole portions 31T having a comb-like shape and arranged along the edge of the opening 31H. The first sub stator core 310 constitutes a one-end-side stator core having the yoke portion 31P magnetically coupled to one end of the first main stator core 351.

The second sub stator core 320 has a flat yoke portion 32P that extends across the axis 301A of the shaft 301, a circular opening 32H about the axis 301A of the shaft 301, and a plurality of pole portions 32T having a comb-like shape and arranged along the edge of the opening 32H. The second sub stator core 320 constitutes an other-end-side stator core having the yoke portion 32P magnetically coupled to the other end of the first main stator core 351.

The third sub stator core 330 has a flat yoke portion 33P that extends across the axis 301A of the shaft 301, a circular opening 33H about the axis 301A of the shaft 301, and a plurality of pole portions 33T having a comb-like shape and arranged along the edge of the opening 33H. The third sub stator core 330 constitutes a one-end-side stator core having the yoke portion 33P magnetically coupled to one end of the second main stator core 352.

The fourth sub stator core 340 has a flat yoke portion 34P that extends across the axis 301A of the shaft 301, a circular opening 34H about the axis 301A of the shaft 301, and a plurality of pole portions 34T having a comb-like shape and arranged along the edge of the opening 34H. The fourth sub stator core 340 constitutes an other-end-side stator core having the yoke portion 34P magnetically coupled to the other end of the second main stator core 352.

Each of the first to fourth sub stator cores 310 to 340 is made of a soft magnetic material and formed from one plate material by, e.g., press working.

As shown in FIG. 26, when a guide hole 329 formed in the second sub stator core 320 engages with a projecting portion 339 formed on the third sub stator core 330, the two sub stator cores are positioned and fixed. Thus, an A-phase stator and a B-phase stator (to be described later) are integrated.

The pole portions 31T of the first sub stator core 310 and the pole portions 32T of the second sub stator core 320 are arranged opposing each other via the rotor 312 and mesh with each other, thereby forming a cylindrical portion that surrounds the first rotor 312, as shown in FIG. 27.

The pole portions 33T of the third sub stator core 330 and the pole portions 34T of the fourth sub stator core 340 are arranged opposing each other via the rotor 314 and mesh with each other, thereby forming a cylindrical portion that surrounds the second rotor 314, like the first and second sub stator cores 310 and 320.

In each of the first to fourth sub stator cores 310 to 340, since the boundary between the pole portions and the yoke portion has an almost circular shape, the pole portions can have accurate inner diameter and pitch. In addition, since the rigidity of the pole portions increases, the accuracy can stably be maintained.

Referring back to FIG. 23, the first sub stator core 310, second sub stator core 320, first coil 372, and first main stator core 351 cooperatively constitute a first stator, i.e., a so-called A-phase stator which rotates the first rotor 312.

The third sub stator core 330, fourth sub stator core 340, second coil 374, and second main stator core 352 cooperatively constitute a second stator, i.e., a so-called B-phase stator which rotates the second rotor 314.

The outer surface of the first sub stator core 310 is covered with the protective end plate 380. The fourth sub stator core 340 is fixed to one support wall 261 of the motor holder 260 having an almost U shape by means such as screws.

The first stepping motor 300 has a pair of bearings 382 and 392 to rotatably support the shaft 301. The first bearing 382 is arranged in the end plate 380 of the first stepping motor 300 to axially support a rotor-side end portion 316 of the shaft 301. The second bearing 392 is arranged in a holder support wall 262 of the second stepping motor 400 to axially support an end portion 318 opposite to the end portion 316.

The second bearing 392 is located inside the coil 472 or 474 of the second stepping motor 400 when projected to the plane perpendicular to the axis of the shaft 301. That is, only one coil is present in the plane perpendicular to the axis of the shaft 301. For this reason, the area occupied by the stator cores and coil in the area of plane perpendicular to the shaft 301 can be reduced. As a result, the stepping motor 300 (400) can be made compact, and the degree of freedom in mounting it to the lens-barrel 200 becomes high. Hence, this structure greatly contributes to size reduction of the lens-barrel 200.

Second Embodiment

Figure 28:
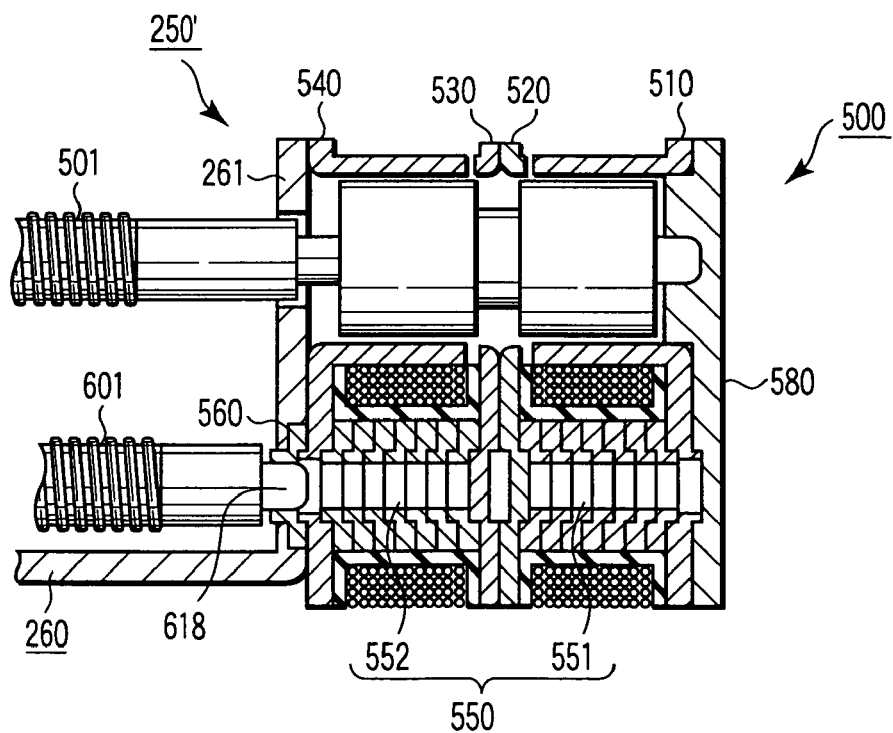
FIG. 28 is a partial longitudinal sectional view showing the detailed structure of a lens driving actuator unit in an optical unit according to the second embodiment of the present invention.
Figure 29:
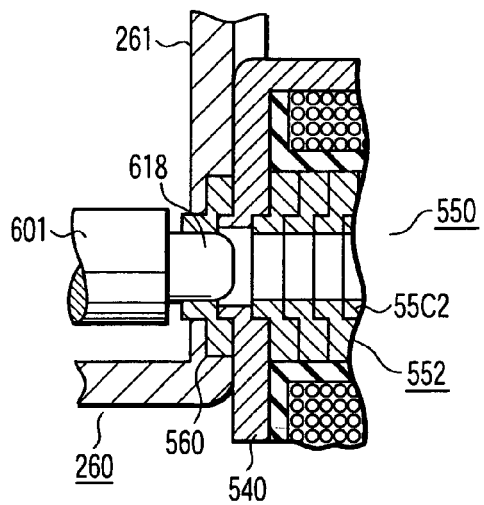
FIG. 29 is an enlarged sectional view showing the arrangement of the main part of the lens driving actuator unit shown in FIG. 28.
Figure 30:
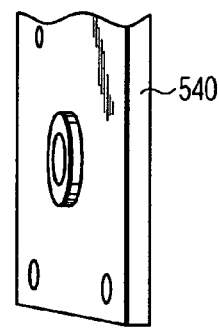
FIG. 30 is a partial perspective view of the fourth stator core of the lens driving actuator unit shown in FIG. 28.

FIG. 28 is a view showing the detailed structure of a lens driving actuator unit in an optical unit according to the second embodiment of the present invention. FIG. 28 is a partial sectional view corresponding to the right half of FIG. 23. FIGS. 29 and 30 are sectional and perspective views, respectively, showing the arrangement of the main part shown in FIG. 28.

The detailed structure of the lens driving actuator unit according to the second embodiment will be described below with reference to FIGS. 28 to 30 mainly in association with points different from the lens driving actuator unit according to the first embodiment. The same reference numerals as in FIG. 23 denote parts having the same functions in FIGS. 28 to 30.

As shown in FIGS. 28 to 30, in a lens driving actuator unit 250' according to the second embodiment, one stepping motor 500 and the other stepping motor 600 (not shown) are integrally coupled by a motor holder 260. A bearing portion 560 is arranged in one support wall 261 of the motor holder 260, which is coupled to the stepping motor 500. The bearing portion 560 axially supports a distal end 618 of a rotating shaft 601 of the other stepping motor 600 (not shown). The bearing portion 560 is formed into the same shape as that of a core plate 55C2 that constitutes a second main stator core 552 of a main stator core 550 of the stepping motor 500. The core plate 55C2 has almost the same shape as that of the core plate 35C in the first embodiment such that one surface of the disk-shaped core member has, at its central portion, a projecting portion corresponding to a recess portion of the other surface. However, the core plate 55C2 has a through hole at its central portion and is set such that the projecting surface faces the support wall 261.

Third Embodiment

Figure 31:
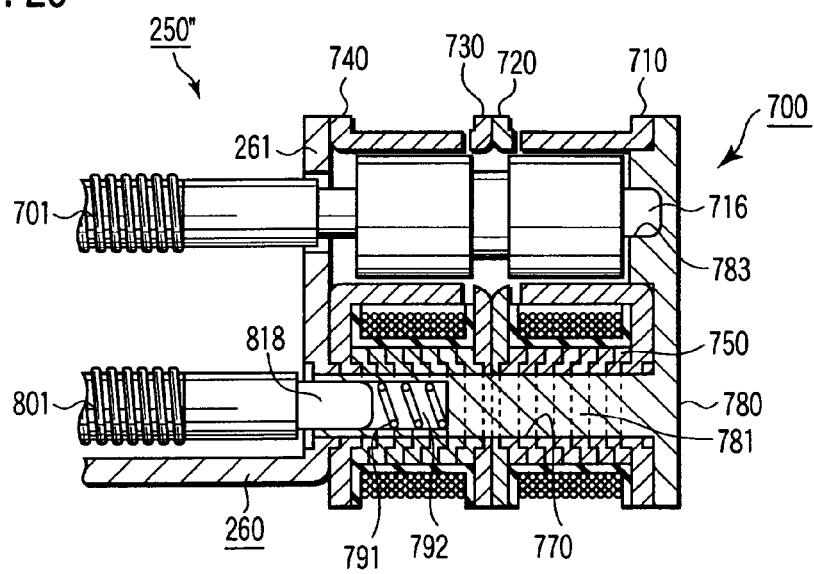
FIG. 31 is a partial longitudinal sectional view showing the detailed structure of a lens driving actuator unit in an optical unit according to the third embodiment of the present invention.
Figure 32A:
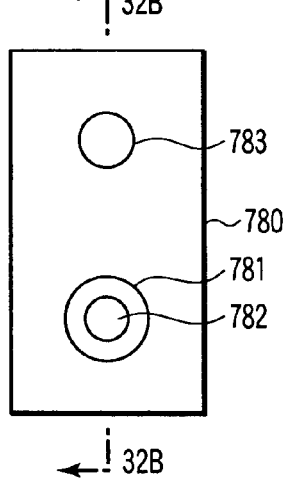
FIG. 32A is a front view showing the end plate of the lens driving actuator unit in the optical unit.
Figure 32B:
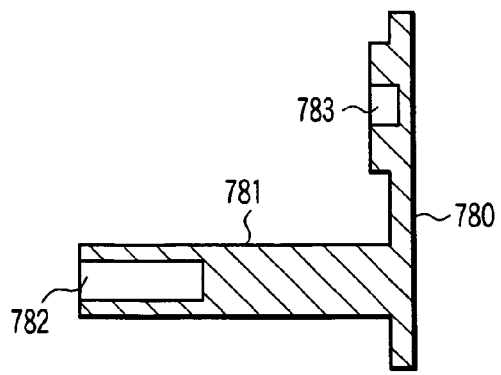
FIG. 32B is a sectional view taken along a line 32B-32B in FIG. 32A.

FIG. 31 is a view showing the detailed structure of a lens driving actuator unit in an optical unit according to the third embodiment of the present invention. FIG. 31 is a partial sectional view corresponding to the right half of FIG. 23, like FIG. 28. FIG. 32A is a front view showing the structure of an end plate 780. FIG. 32B is a sectional view taken along a line 32B-32B in FIG. 32A.

The detailed structure of the lens driving actuator unit according to the third embodiment will be described below with reference to FIGS. 31 to 32B mainly in association with points different from the first embodiment. The same reference numerals as in FIG. 23 denote parts having the same functions in FIGS. 31 to 32B.

As shown in FIG. 31, in a lens driving actuator unit 250" according to the third embodiment, one stepping motor 700 and the other stepping motor 800 (not shown) are integrally coupled by a motor holder 260. A columnar boss portion 781 is formed in the inner surface of the protective end plate 780 which is attached to the outermost portion of the stepping motor 700. The boss portion 781 is inserted into a through hole 770 formed at the central portion of a main stator core 750 of the stepping motor 700. The through hole 770 and boss portion 781 are formed in a direction parallel to a rotating shaft 701 of the stepping motor 700.

A bearing portion 782 made by a cylindrical hole is formed at the distal end of the boss portion 781, as shown in FIG. 32B. The bearing portion 782 axially supports a distal end portion 818 of a rotating shaft 801 of the stepping motor 800 (not shown) that constitutes part of the lens driving actuator unit 250".

The bearing portion 782 has a thrust bearing 791 which receives the distal end portion 818 of the rotating shaft 801 and a biasing member (e.g., a coil spring) 792 which biases the thrust bearing 791 against the distal end portion 818 of the rotating shaft 801. A bearing 783 which receives a rotor-side end portion 716 of the rotating shaft 701 of the stepping motor 700 is arranged at another portion on the inner surface of the end plate 780.

The above-described stepping motors 300 (400), 500 (600), and 700 (800), and the optical unit 14 having the stepping motors have the following characteristics.

[31] The stepping motor 300 (400) is characterized by comprising the shaft 301 (401) rotatably supported, the rotor 300R (400R) which comprises a permanent magnet arranged on the shaft 301 (401), and the stator 300S (400S) including a magnetization control coil which is arranged adjacent in parallel to the axis of the rotor 300R (400R) and the stator core SC which is magnetization-controlled by the coil, wherein the stator core SC in the stator 300S (400S) comprises the main stator core 350 (450) which is arranged in the coil and the sub stator cores 310 to 340 (410 to 440) whose yoke portion is magnetically coupled to the main stator core 350 (450) and whose pole portions that apply a rotating magnetic field to the rotor 300R (400R) are arranged around the rotor 300R (400R), and the main stator core 350 (450) is formed by integrally stacking a plurality of core plates 35C (45C) and contact-bonding the core plates to each other on both surfaces and is coupled to the yoke portion of the sub stator cores 310 to 340 (410 to 440) by contact bonding.

In the stepping motor 300 (400), since the main stator cores 350 (450) are formed as stacked core, the loss due to an eddy current is small, and the energy efficiency is high. In a general stepping motor, since a coil is arranged around pole portions, the diameter of the coil inevitably becomes large. To the contrary, the coil according to the embodiments is arranged not around the pole portions but at a position almost parallel to the shaft 301 or 401. Hence, the coil diameter can be reduced. With this structure, the stepping motor 300 or 400 can have a form with a small width W, as shown in FIG. 27. In addition, since the manufacture and assembly of the stator core SC can be executed only by pressing, the manufacturing cost can be reduced by automating the assembly. Especially, since a material such as a silicon steel plate that is inexpensive and has a satisfactory magnetic characteristic can be used for the main stator core 350 (450), cost reduction and high performance can be expected. Furthermore, since the main stator core 350 (450) and sub stator cores 310 to 340 (410 to 440) are fixed by the contact bonding means, no rotation stop means is required. The manufacturing cost can be reduced even due to this reason.

[32] The stepping motor 300 (400) is characterized by comprising the shaft 301 (401) rotatably supported, the first and second rotors 312 and 314 (412 and 414) each of which comprises a permanent magnet arranged on the shaft 301 (401), and the stator 300S (400S) including the first and second magnetization control coils 372 and 374 (472 and 474) which are arranged adjacent in parallel to the axes of the first and second rotors 312 and 314 (412 and 414) and the stator cores 310 to 350 (410 to 450) which are magnetization-controlled by the first and second coils, the stator core in the stator 300S (400S) comprises the first and second main stator cores 351 and 352 (451 and 452) which are arranged inside the first and second coils 372 and 374 (472 and 474), respectively, and the first and second sub stator cores 310 and 320 (410 and 420) and third and fourth sub stator cores 330 and 340 (430 and 440) whose yoke portions are magnetically coupled to the first and second main stator cores 351 and 352 (451 and 452), respectively, and whose pole portions that apply a rotating magnetic field to the first and second rotors 312 and 314 (412 and 414) are arranged around the first and second rotors 312 and 314 (412 and 414), respectively, and the first and second main stator cores 351 and 352 (451 and 452) are formed by integrally stacking the plurality of core plates 35C and contact-bonding the core plates to each other on both surfaces and are coupled to the yoke portions of the first and second sub stator cores 310 and 320 (410 and 420) and third and fourth sub stator cores 330 and 340 (430 and 440), respectively, by contact bonding.

[33] The stepping motor 300 (400) according to [31] or [32] is characterized in that the magnetization control coils 372 and 374 (472 and 474) are wound around the bobbins 376 and 378 (476 and 478) each having, at the central portion, a hollow portion capable of receiving a corresponding one of the main stator cores 351 and 352 (451 and 452), respectively.

[34] The stepping motor 300 (400) according to [31], [32], or [33] is characterized in that the sub stator cores comprise one-end-side stator cores 310 and 330 (410 and 430) each having the yoke portion magnetically coupled to one end of a corresponding one of the main stator cores 351 and 352 (451 and 452), and other-end-side stator cores 320 and 340 (420 and 440) each having the yoke portion magnetically coupled to the other end of a corresponding one of the main stator cores 351 and 352 (451 and 452), and the pole portions of each of the one-end-side stator cores and those of a corresponding one of the other-end-side stator cores are arranged to oppose via a corresponding one of the rotors 312 and 314 (412 and 414).

[35] The stepping motor 300 (400) according to [34] is characterized in that each of the core plates 35C that constitute the main stator cores 351 and 352 (451 and 452) is formed such that one surface of the disk-shaped core member has a projecting portion corresponding to the recess portion of the other surface.

[36] The stepping motor 500 (600) according to [35] is characterized in that the bearing portion 560 which is arranged on the support wall 261 of one stepping motor 500 to axially support the distal end 618 of the rotating shaft 601 of the other stepping motor 600 (not shown) that constitutes part of the lens driving actuator unit 250 together with one stepping motor 500 has the same shape as that of the core plate 55C2 which constitutes the main stator core 550 of one stepping motor 500.

In the stepping motor 500 (600), the bearing portion 560 has the same shape as that of the core plate 55C2 that constitutes the second main stator core 552 in the stepping motor 500. For this reason, the bearing portion 560 can be formed continuously and simultaneously with the manufacturing step of the main stator core 550 and, more particularly, the manufacturing step of the second main stator core 552 using the same removal and press-fitting steps. Hence, the cost can be reduced.

[37] The stepping motor 700 (800) according to [31] or [32] is characterized in that the through hole 770 extending in the direction parallel to the rotating shaft 701 of the stepping motor 700 is formed at the central portion of the main stator core 750 (850), the boss portion 781 formed on the end plate 780 that protects an outermost stator core 710 is inserted into the through hole 770, and the boss portion 781 has at the distal end the bearing portion 782 which axially supports the distal end portion 818 of the rotating shaft 801 of the other stepping motor 800 that constitutes part of the stepping motor unit 250 together with the stepping motor 700.

In the stepping motor 700 (800), when the A-phase stator and B-phase stator are simply fitted on the boss 781 formed on the end plate 780, the two stators are positioned and integrated. For this reason, the assembly cost can further be reduced.

[38] The stepping motor 700 (800) according to [37] is characterized in that the bearing portion 782 has the thrust bearing 791 which receives the end portion 818 of the rotating shaft 801 and the biasing member 792 which biases the thrust bearing 791 against the end portion 818 of the rotating shaft 801.

[39] The optical unit 14 is characterized in that the stepping motor of any one of [31] to [38] is mounted as the lens driving actuator unit in the lens unit LU.

[40] The optical unit 14 according to [39] is characterized by further comprising the light amount adjustment mechanism 120 to adjust the light amount of incident light from an object, the light amount adjustment actuator unit 150 which drives the light amount adjustment mechanism 120, the lens group 22 which intervenes in the optical path that passes light whose light amount is adjusted by the light amount adjustment mechanism 120, and is arranged to be movable in the direction of an optical axis along the guide shafts 224 and 225, and the lens driving actuator unit 250 which drives and moves the lens group 22 to a predetermined position in the direction of the optical axis OB, wherein the lens driving actuator unit 250 and light amount adjustment actuator unit 150 are arranged along a linear region that is substantially parallel to the direction of the optical axis OB of the lens group 22.

[41] The optical unit 14 according to [40] is characterized in that the light amount adjustment mechanism 120 comprises a plurality of light amount adjustment members (130 and 140), and the light amount adjustment actuator unit 150 comprises a plurality of actuators (170 and 180) corresponding to the plurality of light amount adjustment members (130 and 140), the shafts (172 and 182) of the plurality of actuators (170 and 180) are arrayed in one direction in a first plane, and the shafts (301 and 401) of the motors (300 and 400) in the lens driving actuator unit 250 are arrayed in a second plane parallel to the first plane.

[42] The optical unit 14 according to any one of [39] to [41] is characterized by further comprising a reflecting optical member (prism 21) which deflects a light beam incident from an object along the first optical axis OA to the direction of the second optical axis OB which is perpendicular to the first optical axis OA.

[43] The optical unit 14 according to [42] is characterized in that a size LA2 of the light amount adjustment actuator unit 150 in the direction along the first optical axis OA and a size LA3 of the lens driving actuator unit 250 in the direction along the first optical axis OA are set to be substantially the same as a size LA1 of the reflecting optical member (21) in the direction of the first optical axis OA.

[44] The optical unit 14 according to [42] is characterized in that the size LA2 of the light amount adjustment actuator unit 150 in the direction along the first optical axis OA and the size LA3 of the lens driving actuator unit 250 in the direction along the first optical axis OA are set to be approximate to each other.

MODIFICATIONS

The optical unit according to the embodiments can be modified as follows:

In place of the prism, a mirror is used as the reflecting optical member.

Some of the magnetic pole portions in the light amount adjustment unit SU are formed from non-stacked cores.

Some of the magnetic members except the pole portions in the light amount adjustment unit SU are formed from stacked cores.

What is claimed is:

1. A unit comprising:
an optical member which receives a light beam from an object such that the light beam is bent at a substantially right angle;
a light amount adjustment mechanism to adjust a light amount of the light beam received by the optical member;
a light amount adjustment unit which includes a first case which accommodates the optical member and the light amount adjustment mechanism;
a lens group which is movably arranged to obtain an object image from the light beam whose light amount is adjusted by the light amount adjustment mechanism;
a lens unit which includes a second case which accommodates the lens group; and
coupling means provided between the first case and the second case to couple the light amount adjustment unit and the lens unit.

2. A unit according to claim 1, wherein
the light amount adjustment mechanism is arranged in the light amount adjustment unit on a coupling surface to the lens unit.

3. A unit according to claim 1, further comprising:
a light amount adjustment actuator which is accommodated in the first case and which is adapted to drive the light amount adjustment mechanism; and
a lens driving actuator which is accommodated in the second case and which is adapted to drive the lens group,
wherein
the light amount adjustment actuator unit and the lens driving actuator unit are arranged along a linear region that is substantially parallel to a direction of an optical axis of the lens group.

4. A unit according to claim 1, wherein
the second case has, at a coupling portion to be coupled to the first case, positioning members to position the optical member accommodated in the first case.

5. A unit according to claim 4, wherein
the positioning member provided in the second case also serves as a positioning, member between the cases to position the first case and the second case.

6. A unit according to claim 5, wherein
the positioning member comprises a projecting portion which projects along a direction of an optical axis, the first case has an insertion portion which receives the projecting portion, and the optical member has an engaging portion which engages with the projecting portion inserted into the insertion portion.

7. An electronic camera having an optical unit of claim 1.

8. An electronic camera having an optical unit of claim 6.

* * * * *